United States Patent
Briggs

(10) Patent No.: US 8,638,446 B2
(45) Date of Patent: Jan. 28, 2014

(54) LASER SCANNER OR LASER TRACKER HAVING A PROJECTOR

(75) Inventor: Clark H. Briggs, DeLand, FL (US)

(73) Assignee: Faro Technologies, Inc., Lake Mary, FL (US)

( * ) Notice: Subject to any disclaimer, the term of this patent is extended or adjusted under 35 U.S.C. 154(b) by 224 days.

(21) Appl. No.: 13/227,504

(22) Filed: Sep. 8, 2011

(65) Prior Publication Data

US 2012/0057174 A1 Mar. 8, 2012

Related U.S. Application Data

(63) Continuation-in-part of application No. 13/006,507, filed on Jan. 14, 2011, now Pat. No. 8,533,967, and a continuation-in-part of application No. 13/006,468, filed on Jan. 14, 2011, and a continuation-in-part of application No. 13/006,524, filed on Jan. 14, 2011.

(60) Provisional application No. 61/380,869, filed on Sep. 8, 2010, provisional application No. 61/296,555, filed on Jan. 20, 2010, provisional application No. 61/351,347, filed on Jun. 4, 2010, provisional application No. 61/355,279, filed on Jun. 16, 2010, provisional application No. 61/296,555, filed on Jan. 20, 2010, provisional application No. 61/351,347, filed on Jun. 4, 2010, provisional application No. 61/355,279, filed on Jun. 16, 2010, provisional application No. 61/296,555, filed on Jan. 20, 2010.

(51) Int. Cl.
*G01B 11/24* (2006.01)
*G03B 21/14* (2006.01)

(52) U.S. Cl.
USPC ............. 356/603; 356/607; 356/4.01; 33/503

(58) Field of Classification Search
USPC .................. 356/601–623, 4.01, 3.11; 33/503; 348/46; 345/419, 473
See application file for complete search history.

(56) References Cited

U.S. PATENT DOCUMENTS

| | | | |
|---|---|---|---|
| 1,535,312 A | 4/1925 | Hosking | |
| 1,918,813 A | 7/1933 | Kinzy | |

(Continued)

FOREIGN PATENT DOCUMENTS

| | | |
|---|---|---|
| CN | 2508896 | 9/2002 |
| CN | 2665668 | 12/2004 |

(Continued)

OTHER PUBLICATIONS

German Office Action and English Language summary for DE 112011100292.0 filed Jul. 3, 2012, based on PCT Application US2011/021252 filed Jan. 14, 2011.

(Continued)

*Primary Examiner* — Hoa Pham
(74) *Attorney, Agent, or Firm* — Cantor Colburn LLP

(57) ABSTRACT

A laser scanner or a laser tracker includes a light source that emits a light beam within an environment, and a data capture component that captures the light beam reflected back to the laser scanner or tracker from the environment. The laser scanner or tracker also includes a projector integrated within a body of the laser scanner or tracker or mounted to the body of the laser scanner or tracker at a predetermined location, the projector being operable to project visible information onto an object located within the environment, the projected visible information being indicative of images, data or information, the projected visible information being at least one of design intent information, information acquired by the laser scanner or tracker, or guidance to an operator.

20 Claims, 11 Drawing Sheets

(56) References Cited

U.S. PATENT DOCUMENTS

| | | |
|---|---|---|
| 2,316,573 A | 4/1940 | Egy |
| 2,333,243 A | 11/1943 | Glab |
| 2,702,683 A | 2/1955 | Green et al. |
| 2,748,926 A | 6/1956 | Leahy |
| 2,983,367 A | 6/1958 | Paramater et al. |
| 2,924,495 A | 9/1958 | Haines |
| 2,966,257 A | 11/1959 | Littlejohn |
| 3,066,790 A | 12/1962 | Armbruster |
| 3,458,167 A | 7/1969 | Cooley, Jr. |
| 4,138,045 A | 2/1979 | Baker |
| 4,340,008 A | 7/1982 | Mendelson |
| 4,379,461 A | 4/1983 | Nilsson et al. |
| 4,424,899 A | 1/1984 | Rosenberg |
| 4,430,796 A | 2/1984 | Nakagawa |
| 4,457,625 A | 7/1984 | Greenleaf et al. |
| 4,506,448 A | 3/1985 | Topping et al. |
| 4,537,233 A | 8/1985 | Vroonland et al. |
| 4,606,696 A | 8/1986 | Slocum |
| 4,659,280 A | 4/1987 | Akeel |
| 4,663,852 A | 5/1987 | Guarini |
| 4,664,588 A | 5/1987 | Newell et al. |
| 4,676,002 A | 6/1987 | Slocum |
| 4,714,339 A | 12/1987 | Lau et al. |
| 4,751,950 A | 6/1988 | Bock |
| 4,790,651 A | 12/1988 | Brown et al. |
| 4,816,822 A | 3/1989 | Vache et al. |
| 4,882,806 A | 11/1989 | Davis |
| 4,954,952 A | 9/1990 | Ubhayakar et al. |
| 4,982,841 A | 1/1991 | Goedecke |
| 4,996,909 A | 3/1991 | Vache et al. |
| 5,025,966 A | 6/1991 | Potter |
| 5,027,951 A | 7/1991 | Johnson |
| 5,189,797 A | 3/1993 | Granger |
| 5,205,111 A | 4/1993 | Johnson |
| 5,211,476 A | 5/1993 | Coudroy |
| 5,213,240 A | 5/1993 | Dietz et al. |
| 5,219,423 A | 6/1993 | Kamaya |
| 5,239,855 A | 8/1993 | Schleifer et al. |
| 5,289,264 A | 2/1994 | Steinbichler |
| 5,319,445 A | 6/1994 | Fitts |
| 5,332,315 A | 7/1994 | Baker et al. |
| 5,372,250 A | 12/1994 | Johnson |
| 5,373,346 A | 12/1994 | Hocker |
| 5,402,582 A | 4/1995 | Raab |
| 5,412,880 A | 5/1995 | Raab |
| 5,430,384 A | 7/1995 | Hocker |
| 5,455,670 A | 10/1995 | Payne et al. |
| 5,455,993 A | 10/1995 | Link et al. |
| 5,510,977 A | 4/1996 | Raab |
| 5,528,505 A | 6/1996 | Granger et al. |
| 5,535,524 A | 7/1996 | Carrier et al. |
| 5,611,147 A | 3/1997 | Raab |
| 5,623,416 A | 4/1997 | Hocker, III |
| 5,682,508 A | 10/1997 | Hocker, III |
| 5,724,264 A | 3/1998 | Rosenberg et al. |
| 5,752,112 A | 5/1998 | Paddock et al. |
| 5,754,449 A | 5/1998 | Hoshal et al. |
| 5,768,792 A | 6/1998 | Raab |
| 5,829,148 A | 11/1998 | Eaton |
| 5,832,416 A | 11/1998 | Anderson |
| 5,887,122 A | 3/1999 | Terawaki et al. |
| 5,926,782 A | 7/1999 | Raab |
| 5,956,857 A | 9/1999 | Raab |
| 5,973,788 A | 10/1999 | Pettersen et al. |
| 5,978,748 A | 11/1999 | Raab |
| 5,983,936 A | 11/1999 | Schwieterman et al. |
| 5,996,790 A | 12/1999 | Yamada et al. |
| 5,997,779 A | 12/1999 | Potter |
| D423,534 S | 4/2000 | Raab et al. |
| 6,050,615 A | 4/2000 | Weinhold |
| 6,060,889 A | 5/2000 | Hocker |
| 6,067,116 A | 5/2000 | Yamano et al. |
| 6,125,337 A | 9/2000 | Rosenberg et al. |
| 6,131,299 A | 10/2000 | Raab et al. |
| 6,151,789 A | 11/2000 | Raab et al. |
| 6,163,294 A | 12/2000 | Talbot |
| 6,166,504 A | 12/2000 | Iida et al. |
| 6,166,809 A | 12/2000 | Pettersen et al. |
| 6,166,811 A | 12/2000 | Long et al. |
| 6,219,928 B1 | 4/2001 | Raab et al. |
| D441,632 S | 5/2001 | Raab et al. |
| 6,240,651 B1 | 6/2001 | Schroeder et al. |
| 6,253,458 B1 | 7/2001 | Raab et al. |
| 6,282,195 B1 | 8/2001 | Miller et al. |
| 6,298,569 B1 | 10/2001 | Raab et al. |
| 6,339,410 B1 | 1/2002 | Milner et al. |
| 6,366,831 B1 | 4/2002 | Raab |
| 6,408,252 B1 | 6/2002 | De Smet |
| 6,418,774 B1 | 7/2002 | Brogårdh et al. |
| 6,438,856 B1 | 8/2002 | Kaczynski |
| 6,442,419 B1 | 8/2002 | Chu et al. |
| 6,470,584 B1 | 10/2002 | Stoodley |
| 6,477,784 B2 | 11/2002 | Schroeder et al. |
| 6,519,860 B1 | 2/2003 | Bieg et al. |
| D472,824 S | 4/2003 | Raab et al. |
| 6,547,397 B1 | 4/2003 | Kaufman et al. |
| 6,598,306 B2 | 7/2003 | Eaton |
| 6,611,346 B2 | 8/2003 | Granger |
| 6,611,617 B1 | 8/2003 | Crampton |
| 6,612,044 B2 | 9/2003 | Raab et al. |
| 6,621,065 B1 | 9/2003 | Fukumoto et al. |
| 6,626,339 B2 | 9/2003 | Gates et al. |
| 6,633,051 B1 | 10/2003 | Holloway et al. |
| 6,668,466 B1 | 12/2003 | Bieg et al. |
| D491,210 S | 6/2004 | Raab et al. |
| 6,764,185 B1 | 7/2004 | Beardsley et al. |
| 6,789,327 B2 | 9/2004 | Roth et al. |
| 6,820,346 B2 | 11/2004 | Raab et al. |
| 6,822,749 B1 | 11/2004 | Christoph |
| 6,826,664 B2 | 11/2004 | Hocker, III et al. |
| 6,868,359 B2 | 3/2005 | Raab |
| 6,879,933 B2 | 4/2005 | Steffey et al. |
| 6,892,465 B2 | 5/2005 | Raab et al. |
| 6,895,347 B2 | 5/2005 | Dorny et al. |
| 6,901,673 B1 | 6/2005 | Cobb et al. |
| 6,904,691 B2 | 6/2005 | Raab et al. |
| 6,920,697 B2 | 7/2005 | Raab et al. |
| 6,925,722 B2 | 8/2005 | Raab et al. |
| 6,931,745 B2 | 8/2005 | Granger |
| 6,935,748 B2 | 8/2005 | Kaufman et al. |
| 6,948,255 B2 | 9/2005 | Russell |
| 6,965,843 B2 | 11/2005 | Raab et al. |
| 7,003,892 B2 | 2/2006 | Eaton et al. |
| 7,006,084 B1 | 2/2006 | Buss et al. |
| 7,024,032 B2 | 4/2006 | Kidd et al. |
| 7,032,321 B2 | 4/2006 | Raab et al. |
| 7,040,136 B2 | 5/2006 | Forss et al. |
| 7,051,447 B2 | 5/2006 | Kikuchi et al. |
| 7,106,421 B2 * | 9/2006 | Matsuura et al. ............ 356/4.01 |
| 7,117,107 B2 | 10/2006 | Dorny et al. |
| 7,120,092 B2 | 10/2006 | del Prado Pavon et al. |
| 7,152,456 B2 | 12/2006 | Eaton |
| 7,174,651 B2 | 2/2007 | Raab et al. |
| 7,184,047 B1 | 2/2007 | Crampton |
| 7,191,541 B1 | 3/2007 | Weekers et al. |
| 7,193,690 B2 | 3/2007 | Ossig et al. |
| 7,196,509 B2 | 3/2007 | Teng |
| 7,199,872 B2 | 4/2007 | Van Cranenbroeck |
| 7,230,689 B2 | 6/2007 | Lau |
| 7,242,590 B1 | 7/2007 | Yeap et al. |
| 7,249,421 B2 | 7/2007 | MacManus et al. |
| 7,269,910 B2 | 9/2007 | Raab et al. |
| 7,285,793 B2 | 10/2007 | Husted |
| 7,296,979 B2 | 11/2007 | Raab et al. |
| 7,306,339 B2 | 12/2007 | Kaufman et al. |
| 7,312,862 B2 * | 12/2007 | Zumbrunn et al. ...... 356/139.03 |
| 7,313,264 B2 | 12/2007 | Crampton |
| 7,319,512 B2 | 1/2008 | Ohtomo et al. |
| 7,337,344 B2 | 2/2008 | Barman et al. |
| 7,348,822 B2 | 3/2008 | Baer |
| 7,352,446 B2 | 4/2008 | Bridges et al. |
| 7,360,648 B1 | 4/2008 | Blaschke |
| 7,372,558 B2 | 5/2008 | Kaufman et al. |
| 7,372,581 B2 | 5/2008 | Raab et al. |

(56) References Cited

U.S. PATENT DOCUMENTS

| | | |
|---|---|---|
| 7,383,638 B2 | 6/2008 | Granger |
| 7,388,654 B2 | 6/2008 | Raab et al. |
| 7,389,870 B2 | 6/2008 | Slappay |
| 7,395,606 B2 | 7/2008 | Crampton |
| 7,430,068 B2 | 9/2008 | Becker et al. |
| 7,447,931 B1 | 11/2008 | Rischar et al. |
| 7,449,876 B2 | 11/2008 | Pleasant et al. |
| 7,454,265 B2 | 11/2008 | Marsh |
| 7,463,368 B2 | 12/2008 | Morden et al. |
| 7,508,971 B2 | 3/2009 | Vaccaro et al. |
| 7,525,276 B2 | 4/2009 | Eaton |
| 7,545,517 B2 | 6/2009 | Rueb et al. |
| 7,546,689 B2 | 6/2009 | Ferrari et al. |
| 7,552,644 B2 | 6/2009 | Haase et al. |
| 7,561,598 B2 | 7/2009 | Stratton et al. |
| 7,564,250 B2 | 7/2009 | Hocker |
| 7,578,069 B2 | 8/2009 | Eaton |
| D599,226 S | 9/2009 | Gerent et al. |
| 7,589,595 B2 | 9/2009 | Cutler |
| 7,591,077 B2 | 9/2009 | Pettersson |
| 7,591,078 B2 | 9/2009 | Crampton |
| 7,602,873 B2 | 10/2009 | Eidson |
| 7,604,207 B2 | 10/2009 | Hasloecher et al. |
| 7,610,175 B2 | 10/2009 | Eidson |
| 7,614,157 B2 | 11/2009 | Granger |
| 7,624,510 B2 | 12/2009 | Ferrari |
| D607,350 S | 1/2010 | Cooduvalli et al. |
| 7,656,751 B2 | 2/2010 | Rischar et al. |
| 7,693,325 B2 | 4/2010 | Pulla et al. |
| 7,701,592 B2 | 4/2010 | Saint Clair et al. |
| 7,712,224 B2 | 5/2010 | Hicks |
| 7,721,396 B2 | 5/2010 | Fleischman |
| 7,735,234 B2 | 6/2010 | Briggs et al. |
| 7,743,524 B2 | 6/2010 | Eaton et al. |
| 7,752,003 B2 | 7/2010 | MacManus |
| 7,765,707 B2 | 8/2010 | Tomelleri |
| 7,769,559 B2 | 8/2010 | Reichert |
| 7,774,949 B2 | 8/2010 | Ferrari |
| 7,779,548 B2 | 8/2010 | Ferrari |
| 7,779,553 B2 | 8/2010 | Jordil et al. |
| 7,800,758 B1 | 9/2010 | Bridges et al. |
| 7,804,602 B2 | 9/2010 | Raab |
| 7,805,851 B2 | 10/2010 | Pettersson |
| 7,805,854 B2 | 10/2010 | Eaton |
| 7,809,518 B2 | 10/2010 | Zhu et al. |
| RE42,055 E | 1/2011 | Raab et al. |
| RE42,082 E | 2/2011 | Raab et al. |
| 7,881,896 B2 | 2/2011 | Atwell et al. |
| 7,903,261 B2 | 3/2011 | Saint Clair et al. |
| 7,908,757 B2 | 3/2011 | Ferrari |
| 8,052,857 B2 | 11/2011 | Townsend |
| 8,065,861 B2 | 11/2011 | Caputo |
| 8,082,673 B2 | 12/2011 | Desforges et al. |
| 8,099,877 B2 | 1/2012 | Champ |
| 8,123,350 B2 | 2/2012 | Cannell et al. |
| 2001/0004269 A1 | 6/2001 | Shibata et al. |
| 2002/0032541 A1 | 3/2002 | Raab et al. |
| 2002/0087233 A1 | 7/2002 | Raab |
| 2002/0128790 A1 | 9/2002 | Woodmansee |
| 2002/0170192 A1 | 11/2002 | Steffey et al. |
| 2003/0033104 A1 | 2/2003 | Gooche |
| 2003/0053037 A1 | 3/2003 | Blaesing-Bangert et al. |
| 2003/0125901 A1 | 7/2003 | Steffey et al. |
| 2003/0142631 A1 | 7/2003 | Silvester |
| 2003/0167647 A1 | 9/2003 | Raab et al. |
| 2003/0172536 A1 | 9/2003 | Raab et al. |
| 2003/0172537 A1 | 9/2003 | Raab et al. |
| 2003/0208919 A1 | 11/2003 | Raab et al. |
| 2003/0221326 A1 | 12/2003 | Raab et al. |
| 2004/0022416 A1 | 2/2004 | Lemelson et al. |
| 2004/0040166 A1 | 3/2004 | Raab et al. |
| 2004/0103547 A1 | 6/2004 | Raab et al. |
| 2004/0111908 A1 | 6/2004 | Raab et al. |
| 2004/0139265 A1 | 7/2004 | Hocker, III et al. |
| 2004/0162700 A1 | 8/2004 | Rosenberg et al. |
| 2004/0259533 A1 | 12/2004 | Nixon et al. |
| 2005/0016008 A1 | 1/2005 | Raab et al. |
| 2005/0028393 A1 | 2/2005 | Raab et al. |
| 2005/0085940 A1 | 4/2005 | Griggs et al. |
| 2005/0115092 A1 | 6/2005 | Raab et al. |
| 2005/0144799 A1 | 7/2005 | Raab et al. |
| 2005/0151963 A1 | 7/2005 | Pulla et al. |
| 2005/0166413 A1 | 8/2005 | Crampton |
| 2005/0188557 A1 | 9/2005 | Raab et al. |
| 2005/0259271 A1 | 11/2005 | Christoph |
| 2005/0276466 A1 | 12/2005 | Vaccaro et al. |
| 2005/0283989 A1 | 12/2005 | Pettersson |
| 2006/0016086 A1 | 1/2006 | Raab et al. |
| 2006/0017720 A1 | 1/2006 | Li |
| 2006/0026851 A1 | 2/2006 | Raab et al. |
| 2006/0028203 A1 | 2/2006 | Kawashima et al. |
| 2006/0053647 A1 | 3/2006 | Raab et al. |
| 2006/0056459 A1 | 3/2006 | Stratton et al. |
| 2006/0056559 A1 | 3/2006 | Pleasant et al. |
| 2006/0059270 A1 | 3/2006 | Pleasant et al. |
| 2006/0096108 A1 | 5/2006 | Raab et al. |
| 2006/0123649 A1 | 6/2006 | Muller |
| 2006/0129349 A1 | 6/2006 | Raab et al. |
| 2006/0169050 A1 | 8/2006 | Kobayashi et al. |
| 2006/0169608 A1 | 8/2006 | Carnevali |
| 2006/0282574 A1 | 12/2006 | Zotov et al. |
| 2006/0287769 A1 | 12/2006 | Yanagita et al. |
| 2006/0291970 A1 | 12/2006 | Granger |
| 2007/0030841 A1 | 2/2007 | Lee et al. |
| 2007/0043526 A1 | 2/2007 | De Jonge et al. |
| 2007/0050774 A1 | 3/2007 | Eldson et al. |
| 2007/0055806 A1 | 3/2007 | Stratton et al. |
| 2007/0058162 A1 | 3/2007 | Granger |
| 2007/0097382 A1 | 5/2007 | Granger |
| 2007/0105238 A1 | 5/2007 | Mandl et al. |
| 2007/0142970 A1 | 6/2007 | Burbank et al. |
| 2007/0147265 A1 | 6/2007 | Eidson |
| 2007/0147435 A1 | 6/2007 | Hamilton et al. |
| 2007/0147562 A1 | 6/2007 | Eidson |
| 2007/0153297 A1 | 7/2007 | Lau |
| 2007/0163134 A1 | 7/2007 | Eaton |
| 2007/0176648 A1 | 8/2007 | Baer |
| 2007/0177016 A1 | 8/2007 | Wu |
| 2007/0183459 A1 | 8/2007 | Eidson |
| 2007/0185682 A1 | 8/2007 | Eidson |
| 2007/0217169 A1 | 9/2007 | Yeap et al. |
| 2007/0217170 A1 | 9/2007 | Yeap et al. |
| 2007/0221522 A1 | 9/2007 | Yamada et al. |
| 2007/0223477 A1 | 9/2007 | Eidson |
| 2007/0248122 A1 | 10/2007 | Hamilton |
| 2007/0256311 A1 | 11/2007 | Ferrari |
| 2007/0257660 A1 | 11/2007 | Pleasant et al. |
| 2007/0258378 A1 | 11/2007 | Hamilton |
| 2007/0282564 A1 | 12/2007 | Sprague et al. |
| 2007/0294045 A1 | 12/2007 | Atwell et al. |
| 2008/0046221 A1 | 2/2008 | Stathis |
| 2008/0052936 A1 | 3/2008 | Briggs et al. |
| 2008/0066583 A1 | 3/2008 | Lott |
| 2008/0068103 A1 | 3/2008 | Cutler |
| 2008/0080562 A1 | 4/2008 | Burch et al. |
| 2008/0098272 A1 | 4/2008 | Fairbanks et al. |
| 2008/0148585 A1 | 6/2008 | Raab et al. |
| 2008/0154538 A1 | 6/2008 | Stathis |
| 2008/0179206 A1 | 7/2008 | Feinstein et al. |
| 2008/0183065 A1 | 7/2008 | Goldbach |
| 2008/0196260 A1 | 8/2008 | Pettersson |
| 2008/0204699 A1 | 8/2008 | Benz et al. |
| 2008/0216552 A1 | 9/2008 | Ibach et al. |
| 2008/0228331 A1 | 9/2008 | McNerney et al. |
| 2008/0232269 A1 | 9/2008 | Tatman et al. |
| 2008/0235969 A1 | 10/2008 | Jordil et al. |
| 2008/0235970 A1 | 10/2008 | Crampton |
| 2008/0240321 A1 | 10/2008 | Narus et al. |
| 2008/0245452 A1 | 10/2008 | Law et al. |
| 2008/0246943 A1 | 10/2008 | Kaufman et al. |
| 2008/0252671 A1 | 10/2008 | Cannell et al. |
| 2008/0256814 A1 | 10/2008 | Pettersson |
| 2008/0257023 A1 | 10/2008 | Jordil et al. |
| 2008/0263411 A1 | 10/2008 | Baney et al. |

(56) References Cited

U.S. PATENT DOCUMENTS

| | | |
|---|---|---|
| 2008/0271332 A1 | 11/2008 | Jordil et al. |
| 2008/0282564 A1 | 11/2008 | Pettersson |
| 2008/0295349 A1 | 12/2008 | Uhl et al. |
| 2008/0298254 A1 | 12/2008 | Eidson |
| 2008/0309460 A1 | 12/2008 | Jefferson et al. |
| 2009/0000136 A1 | 1/2009 | Crampton |
| 2009/0016475 A1 | 1/2009 | Rischar et al. |
| 2009/0031575 A1 | 2/2009 | Tomelleri |
| 2009/0046140 A1 | 2/2009 | Lashmet et al. |
| 2009/0046895 A1 | 2/2009 | Pettersson et al. |
| 2009/0049704 A1 | 2/2009 | Styles et al. |
| 2009/0083985 A1 | 4/2009 | Ferrari |
| 2009/0089004 A1 | 4/2009 | Vook et al. |
| 2009/0089078 A1 | 4/2009 | Bursey |
| 2009/0089233 A1 | 4/2009 | Gach et al. |
| 2009/0089623 A1 | 4/2009 | Neering et al. |
| 2009/0100643 A1 | 4/2009 | Eidson |
| 2009/0113183 A1 | 4/2009 | Barford et al. |
| 2009/0113229 A1 | 4/2009 | Cataldo et al. |
| 2009/0122805 A1 | 5/2009 | Epps et al. |
| 2009/0125196 A1 | 5/2009 | Velazquez et al. |
| 2009/0139105 A1 | 6/2009 | Granger |
| 2009/0157419 A1 | 6/2009 | Bursey |
| 2009/0165317 A1 | 7/2009 | Little |
| 2009/0177435 A1 | 7/2009 | Heininen |
| 2009/0177438 A1 | 7/2009 | Raab |
| 2009/0187373 A1 | 7/2009 | Atwell et al. |
| 2009/0241360 A1 | 10/2009 | Tait et al. |
| 2009/0249634 A1 | 10/2009 | Pettersson |
| 2009/0265946 A1 | 10/2009 | Jordil et al. |
| 2010/0040742 A1 | 2/2010 | Dijkhuis et al. |
| 2010/0057392 A1 | 3/2010 | York |
| 2010/0078866 A1 | 4/2010 | Pettersson |
| 2010/0095542 A1 | 4/2010 | Ferrari |
| 2010/0122920 A1 | 5/2010 | Butter et al. |
| 2010/0123892 A1 | 5/2010 | Miller et al. |
| 2010/0128259 A1* | 5/2010 | Bridges et al. ............... 356/138 |
| 2010/0134596 A1 | 6/2010 | Becker |
| 2010/0148013 A1 | 6/2010 | Bhotika et al. |
| 2010/0208062 A1 | 8/2010 | Pettersson |
| 2010/0277747 A1* | 11/2010 | Rueb et al. ................... 356/614 |
| 2010/0281705 A1 | 11/2010 | Verdi et al. |
| 2010/0286941 A1 | 11/2010 | Merlot |
| 2010/0312524 A1 | 12/2010 | Siercks et al. |
| 2010/0318319 A1 | 12/2010 | Maierhofer |
| 2010/0325907 A1 | 12/2010 | Tait |
| 2011/0007305 A1 | 1/2011 | Bridges et al. |
| 2011/0007326 A1 | 1/2011 | Daxauer et al. |
| 2011/0013199 A1 | 1/2011 | Siercks et al. |
| 2011/0019155 A1 | 1/2011 | Daniel et al. |
| 2011/0023578 A1 | 2/2011 | Grasser |
| 2011/0043515 A1 | 2/2011 | Stathis |
| 2011/0094908 A1 | 4/2011 | Trieu |
| 2011/0107611 A1 | 5/2011 | Desforges et al. |
| 2011/0107612 A1 | 5/2011 | Ferrari et al. |
| 2011/0107613 A1 | 5/2011 | Tait |
| 2011/0107614 A1 | 5/2011 | Champ |
| 2011/0111849 A1 | 5/2011 | Sprague et al. |
| 2011/0112786 A1 | 5/2011 | Desforges et al. |
| 2011/0164114 A1 | 7/2011 | Kobayashi et al. |
| 2011/0173827 A1 | 7/2011 | Bailey et al. |
| 2011/0173828 A1 | 7/2011 | York |
| 2011/0178755 A1 | 7/2011 | York |
| 2011/0178762 A1 | 7/2011 | York |
| 2011/0178764 A1 | 7/2011 | York |
| 2011/0178765 A1 | 7/2011 | Atwell et al. |
| 2011/0192043 A1 | 8/2011 | Ferrari |
| 2011/0273568 A1 | 11/2011 | Lagassey |
| 2012/0181194 A1 | 7/2012 | McEwan et al. |
| 2012/0210678 A1 | 8/2012 | Alcouloumre et al. |
| 2012/0260611 A1 | 10/2012 | Jones |
| 2013/0025143 A1 | 1/2013 | Bailey et al. |
| 2013/0025144 A1 | 1/2013 | Briggs et al. |
| 2013/0062243 A1 | 3/2013 | Chang et al. |

FOREIGN PATENT DOCUMENTS

| | | |
|---|---|---|
| DE | 3245060 A1 | 7/1983 |
| DE | 4410775 A1 | 10/1995 |
| DE | 29622033 | 2/1997 |
| DE | 19543763 A1 | 5/1997 |
| DE | 19820307 A1 | 11/1999 |
| DE | 10026357 A1 | 1/2002 |
| DE | 202005000983 U1 | 4/2005 |
| DE | 102004015668 B3 | 9/2005 |
| DE | 19720049 B4 | 1/2006 |
| DE | 10114126 B4 | 8/2006 |
| DE | 102004010083 B4 | 11/2006 |
| DE | 102005060967 A1 | 6/2007 |
| DE | 102006023902 | 11/2007 |
| DE | 102006035292 A1 | 1/2008 |
| DE | 102008039838 A1 | 3/2010 |
| DE | 102005036929 B4 | 6/2010 |
| DE | 102008062763 B3 | 7/2010 |
| DE | 102009001894 | 9/2010 |
| EP | 0546784 A2 | 6/1993 |
| EP | 0730210 A1 | 9/1996 |
| EP | 0614517 | 3/1997 |
| EP | 1160539 | 12/2001 |
| EP | 1189124 A1 | 3/2002 |
| EP | 0767357 B1 | 5/2002 |
| EP | 1361414 A1 | 11/2003 |
| EP | 1468791 A1 | 10/2004 |
| EP | 1669713 A1 | 6/2006 |
| EP | 1734425 A2 | 12/2006 |
| EP | 1429109 B1 | 4/2007 |
| EP | 1764579 B1 | 12/2007 |
| EP | 1878543 A2 | 1/2008 |
| EP | 1967930 A2 | 9/2008 |
| EP | 2023077 A1 | 2/2009 |
| EP | 2060530 A1 | 5/2009 |
| EP | 2068067 A1 | 6/2009 |
| EP | 2108917 A1 | 10/2009 |
| EP | 2400261 | 12/2011 |
| FR | 2935043 A1 | 2/2010 |
| GB | 894320 | 4/1962 |
| GB | 2255648 | 11/1992 |
| GB | 2341203 A | 3/2000 |
| GB | 2420241 A | 5/2006 |
| GB | 2452033 A | 2/2009 |
| JP | 5581525 | 6/1955 |
| JP | 5827264 | 2/1983 |
| JP | 06313710 | 11/1994 |
| JP | 6313710 A | 11/1994 |
| JP | 7210586 A | 8/1995 |
| JP | 2003194526 | 7/2003 |
| JP | 2004257927 A | 9/2004 |
| JP | 2005517908 | 6/2005 |
| JP | 2006241833 | 9/2006 |
| JP | 2006301991 A | 11/2006 |
| JP | 2009524057 | 6/2009 |
| WO | 9208568 A1 | 5/1992 |
| WO | 9808050 | 2/1998 |
| WO | 9910706 A1 | 3/1999 |
| WO | 0014474 | 3/2000 |
| WO | 0033149 | 6/2000 |
| WO | 0034733 | 6/2000 |
| WO | 02101323 A2 | 12/2002 |
| WO | 2004096502 A1 | 11/2004 |
| WO | 2005072917 A1 | 8/2005 |
| WO | 2005075875 | 8/2005 |
| WO | 2005100908 A1 | 10/2005 |
| WO | 2006051264 A1 | 5/2006 |
| WO | 2007002319 A1 | 1/2007 |
| WO | 2007028941 A1 | 3/2007 |
| WO | 2007125081 A1 | 11/2007 |
| WO | 2007144906 A1 | 12/2007 |
| WO | 2008027588 A2 | 3/2008 |
| WO | 2008047171 A1 | 4/2008 |
| WO | 2008064276 A1 | 5/2008 |
| WO | 2008066896 | 6/2008 |
| WO | 2008075170 A1 | 6/2008 |
| WO | 2008157061 A1 | 12/2008 |
| WO | 2009001165 A1 | 12/2008 |

(56) References Cited

FOREIGN PATENT DOCUMENTS

| | | |
|---|---|---|
| WO | 2009016185 A1 | 2/2009 |
| WO | 2009083452 A1 | 7/2009 |
| WO | 2009127526 A1 | 10/2009 |
| WO | 2009130169 A1 | 10/2009 |
| WO | 2009149740 A1 | 12/2009 |
| WO | 2010040742 A1 | 4/2010 |
| WO | 2010092131 A1 | 8/2010 |
| WO | 2010108089 A2 | 9/2010 |
| WO | 2010148525 A1 | 12/2010 |
| WO | 2011000435 A1 | 1/2011 |
| WO | 2011000955 A1 | 1/2011 |
| WO | 2011057130 A2 | 5/2011 |
| WO | 2012038446 A1 | 3/2012 |

OTHER PUBLICATIONS

German Patent Application No. 11 2011 100 291.2 dated Dec. 20, 2012.

Japanese Office Action and English Language summary for JP2012-550042 filed Jul. 20, 2012; based on International Application No. PCT/US2011/021249 filed Jan. 14, 2011.

Japanese Office Action and English Language summary for JP2012-550044 filed Jul. 20, 2012; based on International Application No. PCT/US2011/021252 filed Jan. 14, 2011.

Japanese Office Action and English Language summary for JP2012-550043 filed Jul. 20, 2012; based on International Application No. PCT/US2011/021250 filed Jan. 14, 2011.

Examination Report for German Application No. 11 2011 100 193.2 Report dated Dec. 20, 2012; based on PCT/US2011/021249.

Faro Product Catalog; Faro Arm; 68 pages; Faro Technologies Inc. 2009; printed Aug. 3, 2009.

Romer Measuring Arms; Portable CMMs for the shop floor; 20 pages; Hexagon Metrology, Inc. (2009) http//us. ROMER.com.

Dylan, Craig R., High Precision Makes the Massive Bay Bridge Project Work. Suspended in MidAir—Cover Story—Point of Beginning, Jan. 1, 2010, [online] http://www.pobonline.com/Articles/Cover_Story/BNP_GUID_9-5-2006_A_10000000000 . . . [Retreived Jan. 25, 2010].

Franklin, Paul F., What IEEE 1588 Means for Your Next T&M System Design, Keithley Instruments, Inc., [on-line] Oct. 19, 2010, http://www.eetimes.com/General/DisplayPrintViewContent?contentItemId=4209746, [Retrieved Oct. 21, 2010].

HYDROpro Navigation, Hydropgraphic Survey Software, Trimble, www.trimble.com, Copyright 1997-2003.

Trimble—Trimble SPS630, SPS730 and SPS930 Universal Total Stations, [on-line] http://www.trimble.com/sps630_730_930.shtml (1 of 4), [Retreived Jan. 26, 2010 8:50:29AM].

Written Opinion of the International Searching Authority for International Application No. PCT/US2011/021253 mailed Mar. 22, 2012.

International Preliminary Report on Patentability for International Application No. PCT/US2011/021253; Date of Completion May 9, 2012.

International Preliminary Report on Patentability for International Application No. PCT/US2011/021274; Date of Completion Apr. 12, 2012.

International Search Report of the International Searching Authority for Application No. PCT/US2013/022186; Date of Mailing: May 29, 2013.

Written Opinion of the International Searching Authority for Application No. PCT/US2013/022186; Date of Mailing: May 29, 2013.

International Preliminary Report on Patentability for International Application Serial No. PCT/US2011/021246 International filing date Jan. 14, 2011. Date of Issuance Jul. 24, 2012.

International Preliminary Report on Patentability for International Application Serial No. PCT/US2011/021249 International filing date Jan. 14 2011. Date of Issuance Jul. 24, 2012.

International Preliminary Report on Patentability for International Application Serial No. PCT/US2011/021250 International filing date Jan. 14, 2011. Date of Issuance Jul. 24, 2012.

International Preliminary Report on Patentability for International Application Serial No. PCT/US2011/021252 International filing date Jan. 14, 2011. Date of Issuance Jul. 24, 2012.

International Preliminary Report on Patentability for International Application Serial No. PCT/US2011/021247 International filing date Jan. 14, 2011. Date of Issuance Jul. 24, 2012.

International Preliminary Report on Patentability for International Application Serial No. PCT/US2011/021259. International filing date Jan. 14, 2011. Date of Issuance Jul. 24, 2012.

International Preliminary Report on Patentability for International Application Serial No. PCT/US2011/021262. International filing date Jan. 14, 2011. Date of Issuance Jul. 24, 2012.

International Preliminary Report on Patentability for International Application Serial No. PCT/US2011/021263. International filing date Jan. 14, 2011. Date of Issuance Jul. 24, 2012.

International Preliminary Report on Patentability for International Application Serial No. PCT/US2011/021264. International filing date Jan. 14, 2011. Date of Issuance Jul. 24, 2012.

International Preliminary Report on Patentability for International Application Serial No. PCT/US2011/021270. International filing date Jan. 14, 2011. Date of Issuance Jul. 24, 2012.

International Preliminary Report on Patentability for International Application Serial No. PCT/US2011/021272. International filing date Jan. 14, 2011. Date of Issuance Jul. 24, 2012.

International Preliminary Report on Patentability for International Application Serial No. PCT/US2011/021273. International filing date Jan. 14, 2011. Date of Issuance Jul. 24, 2012.

International Preliminary Report on Patentability for International Application Serial No. PCT/US2011/021276. International filing date Jan. 14, 2011. Date of Issuance Jul. 24, 2012.

International Preliminary Report on Patentability for International Application Serial No. PCT/US2011/021278. International filing date Jan. 14, 2011. Date of Issuance Jul. 24, 2012.

International Preliminary Report on Patentability for International Application Serial No. PCT/US2011/021794. International filing date Jan. 20, 2011. Date of Issuance Jul. 24, 2012.

International Preliminary Report on Patentability for International Application Serial No. PCT/US2011/020625; International Filing Date of Jan. 10, 2011. Date of Issuance Jul. 17, 2012.

International Search Report for International Application No. PCT/US2011/021247 mailed Aug. 26, 2011.

Written Opinion of the International Searching Authority for International Application No. PCT/US2011/021247 mailed Aug. 26, 2011.

Information on Electro-Optical Information Systems; EOIS 3D Mini-Moire C.M.M. Sensor for Non-Contact Measuring & Surface Mapping; Direct Dimensions, Jun. 1995.

ABB Flexible Automation AB: Product Manual IRB 6400R M99, On-Line Manual, Sep. 13, 2006, XP000002657684, Retrieved from the Internet: URL:http://pergatory.mit.edu/kinematiccouplings/case_studies/ABB_Robotics/general/6400R%20Product%20Manual.pdf [retrieved on Aug. 26, 2011].

Anonymous: So wird's gemacht: Mit T-DSL and Windows XP Home Edition gemeinsam ins Internet (Teil 3) Internet Citation, Jul. 2003, XP002364586, Retrieved from Internet: URL:http://support.microsfot.com/kb/814538/DE/ [retrieved on Jan. 26, 2006].

Cho, et al., Implementation of a Precision Time Protocol over Low Rate Wireless Personal Area Networks, IEEE, 2008.

Cooklev, et al., An Implementation of IEEE 1588 Over IEEE 802.11b for Syncrhonization of Wireless Local Area Network Nodes, IEEE Transactions on Instrumentation and Measurement, vol. 56, No. 5, Oct. 2007.

Hart, A., "Kinematic Coupling Interchangeability", Precision Engineering, vol. 28, No. 1, Jan. 1, 2004, pp. 1-15, XP55005507, ISSN: 0141-6359, DOI: 10.1016/S0141-6359(03)00071-0.

International Search Report for International Application No. PCT/US2011/021246 mailed Apr. 12, 2011.

International Search Report for International Application No. PCT/US2011/021248 mailed Sep. 19, 2011.

(56) References Cited

OTHER PUBLICATIONS

International Search Report for International Application No. PCT/US2011/021249 mailed Apr. 21, 2011.
International Search Report for International Application No. PCT/US2011/021250 mailed Apr. 18, 2011.
International Search Report for International Application No. PCT/US2011/021252 mailed Apr. 27, 2011.
International Search Report for International Application No. PCT/US2011/021253 mailed Sep. 26, 2011.
International Search Report for International Application No. PCT/US2011/021259 mailed May 25, 2011.
International Search Report for International Application No. PCT/US2011/021262 mailed May 11, 2011.
International Search Report for International Application No. PCT/US2011/021263 mailed May 4, 2011.
International Search Report for International Application No. PCT/US2011/021264 mailed May 31, 2011.
International Search Report for International Application No. PCT/US2011/020270; Date of Mailing May 2, 2011.
International Search Report for International Application No. PCT/US2011/021272 mailed Apr. 7, 2011.
International Search Report for International Application No. PCT/US2011/020273; Date of Mailing Apr. 20, 2011.
International Search Report for International Application No. PCT/US2011/020274; Date of Mailing May 6, 2011.
International Search Report for International Application No. PCT/US2011/020276; Date of Mailing May 17, 2011.
International Search Report for International Application No. PCT/US2011/021278 mailed May 25, 2011.
International Search Report for International Application No. PCT/US2011/020625; Date of Mailing Feb. 25, 2011.
International Search Report for International Application No. PCT/US2011/021794 mailed Sep. 23, 2011.
Jasperneite, et al., Enhancements to the Time Synchronization Standard IEEE-1588 for a System of Cascaded Bridges, IEEE, 2004.
Romer "Romer Absolute Arm Product Brochure" (2010); Hexagon Metrology; www.hexagonmetrology.com; Hexagon AB 2010.
Romer "Romer Absolute Arm Maximum Performance Portable Measurement" (Printed Oct. 2010); Hexagon Metrology, Inc. http://us:ROMER.com; Hexagon Metrology, Inc 2010.
Sauter, et al., Towards New Hybrid Networks for Industrial Automation, IEEE, 2009.
Spada, et al., IEEE 1588 Lowers Integration Costs in Continuous Flow Automated Production Lines, XP-002498255, ARC Insights, Insight # 2003-33MD&H, Aug. 20, 2003.
Willoughby, P., "Elastically Averaged Precisoin Alignment", In: "Doctoral Thesis", Jun. 1, 2005, Massachusetts Institute of Technology, XP55005620, abstract 1.1 Motivation, Chapter 3, Chapter 6.
Written Opinion of the International Searching Authority for International Application No. PCT/US2011/021246 mailed Apr. 12, 2011.
Written Opinion of the International Searching Authority for International Application No. PCT/US2011/021248 mailed Sep. 19, 2011.
Written Opinion of the International Searching Authority for International Application No. PCT/US2011/021249 mailed Apr. 21, 2011.
Written Opinion of the International Searching Authority for International Application No. PCT/US2011/021250 mailed Apr. 18, 2011.
Written Opinion of the International Searching Authority for International Application No. PCT/US2011/021252 mailed Apr. 27, 2011.
Written Opinion of the International Searching Authority for International Application No. PCT/US2011/021253 mailed Sep. 26, 2011.
Written Opinion of the International Searching Authority for International Application No. PCT/US2011/021259 mailed May 25, 2011.
Written Opinion of the International Searching Authority for International Application No. PCT/US2011/021262 mailed May 11, 2011.
Written Opinion of the International Searching Authority for International Application No. PCT/US2011/021263 mailed May 4, 2011.
Written Opinion of the International Searching Authority for International Application No. PCT/US2011/021264 mailed May 31, 2011.
Written Opinion of the International Searching Authority for International Application No. PCT/US2011/021270 mailed May 2, 2011.
Written Opinion of the International Searching Authority for International Application No. PCT/US2011/021272 mailed Apr. 7, 2011.
Written Opinion of the International Searching Authority for International Application No. PCT/US2011/021273 mailed Apr. 20, 2011.
Written Opinion of the International Searching Authority for International Application No. PCT/US2011/021274 mailed May 6, 2011.
Written Opinion of the International Searching Authority for International Application No. PCT/US2011/021276 mailed May 6, 2011.
Written Opinion of the International Searching Authority for International Application No. PCT/US2011/021278 mailed May 25, 2011.
Written Opinion of the International Searching Authority for International Application No. PCT/US2011/020625: Filed Jan. 10, 2011.
Written Opinion of the International Searching Authority for International Application No. PCT/US2011/021794 mailed Sep. 23, 2011.
International Search Report for International Patent Application PCT/US2011/050787; mailing date Nov. 3, 2011.
Written Opinion of the International Searching Authority for International Patent Application PCT/US2011/050787; mailing date Nov. 3, 2011.
GoMeasure3D—Your source for all things measurement, Baces 3D 100 Series Portable CMM from GoMeasure3D, [online], [retrieved on Nov. 29, 2011], http://www.gomeasure3d.com/baces100.html.
It is Alive in the Lab, Autodesk University, Fun with the Immersion MicroScribe Laser Scanner, [online], [retrieved on Nov. 29, 2011], http://labs.blogs.com/its_alive_in_the_lab/2007/11/fun-with-the-im.html.
Ghost 3D Systems, Authorized MicroScribe Solutions, FAQs—MicroScribe 3D Laser, MicroScan Tools, & related info, [online], [retrieved on Nov. 29, 2011], http://microscribe.ghost3d.com/gt_microscan-3d_faqs.htm,.
Electro-Optical Information Systems, "The Handy Handheld Digitizer" [online], [retrieved on Nov. 29, 2011], http://vidibotics.com/htm/handy.htm.
Kreon Laser Scanners, Getting the Best in Cutting Edge 3D Digitizing Technology, B3-D MCAD Consulting/Sales [online], [retrieved on Nov. 29, 2011], http://www.b3-d.com/Kreon.html.
MicroScan 3D User Guide, RSI GmbH, 3D Systems & Software, Oberursel, Germany, email: info@rsi-gmbh.de, Copyright RSI Roland Seifert Imaging GmbH 2008.
Laser Reverse Engineering with Microscribe, [online], [retrieved on Nov. 29, 2011], http://www.youtube.com/watch?v=8VRz_2aEJ4E&feature=PlayList&p=F63ABF74F30DC81B&playnext=1&playnext_from=PL&index=1.
Examination Report under Section 18(3); Report dated Oct. 31, 2012; Application No. GB1210309.9.
Examination Report under Section 18(3); Report dated Nov. 1, 2012; Application No. GB1210311.5.
Examination Report under Section 18(3); Report dated Nov. 6, 2012; Application No. GB1210306.5.
Mg Lee; "Compact 3D LIDAR based on optically coupled horizontal and vertical Scanning mechanism for the autonomous navigation of robots" (13 pages) vol. 8037; downloaded from http://proceedings.spiedigitallibrary.org/ on Jul. 2, 2013.
Examination Report for German Application No. 11 2011 100 290.4 Report dated Jul. 16, 2013; based on PCT/US2011/021247.
P Ben-Tzvi, et al "Extraction of 3D Images Using Pitch-Actuated 2D Laser Range Finder for Robotic Vision" (6 pages) BNSDOCID <XP 31840390A_1_>.
International Search Report for International Application No. PCT/US2013/040309 mailed Jul. 15, 2013.
International Search Report for International Application No. PCT/US2013/040321 mailed Jul. 15, 2013.

(56) References Cited

OTHER PUBLICATIONS

International Search Report for International Application No. PCT/US/2013/041826 filed May 20, 2013; mailed Jul. 29, 2013.
Yk Cho, et al. "Light-weight 3D LADAR System for Construction Robotic Operations" (pp. 237-244); 26th International Symposium on Automation and Robotics in Construction (ISARC 2009).
Written Opinion for International Application No. PCT/US2013/040309 mailed Jul. 15, 2013.
Written Opinion for International Application No. PCT/US/2013/041826 filed May 20, 2013; mailed Jul. 29, 2013.
Written Opinion for International Application No. PCT/US2013/040321 mailed Jul. 15, 2013.

* cited by examiner

LASER SCANNER OR LASER TRACKER HAVING A PROJECTOR

CROSS-REFERENCE TO RELATED APPLICATIONS

This application claims priority to U.S. Provisional Application No. 61/380,869, filed on Sep. 8, 2010; and to U.S. Non-Provisional application Ser. No. 13/006,507, filed on Jan. 14, 2011; which claims the benefit of priority to U.S. Provisional Application No. 61/296,555 filed on Jan. 20, 2010, to U.S. Provisional Application No. 61/351,347 filed on Jun. 4, 2010 and to U.S. Provisional Application No. 61/355,279 filed on Jun. 16, 2010. The present application also claims priority to U.S. Non-Provisional application Ser. No. 13/006,468, filed on Jan. 14, 2011; which claims the benefit of priority to U.S. Provisional Application No. 61/296,555 filed on Jan. 20, 2010, to U.S. Provisional Application No. 61/351,347 filed on Jun. 4, 2010 and to U.S. Provisional Application No. 61/355,279 filed on Jun. 16, 2010. The present application also claims priority to U.S. Non-Provisional application Ser. No. 13/006,524, filed on Jan. 14, 2011; which claims the benefit of priority to U.S. Provisional Application No. 61/296,555, filed on Jan. 20, 2012; the entire contents of each which are incorporated herein by reference.

FIELD OF THE INVENTION

The present invention relates to coordinate measurement devices, for example, laser scanners, laser trackers, and total stations, and more particularly to laser scanners and laser trackers having one or more relatively small projectors integrated therewith or added thereto by, e.g., mounting thereon, for projecting visual information in the form of images and/or data (e.g., CAD data or scanned point cloud data) onto various surfaces. The projected visual information may, for example, be of a type such as to provide guidance to an operator, such as written instructions, highlighted points to be measured, indicated areas where data are to be taken, and real time feedback on the quality of the data.

BACKGROUND

A laser scanner is one type of coordinate measurement device typically used for non-contact optical scanning of many different types of relatively large closed or open spaces or objects, for example, interior spaces of buildings, industrial installations and tunnels, or exterior shapes of planes, automobiles or boats. Laser scanners can be used for many different purposes, including industrial applications and accident reconstruction. A laser scanner optically scans and measures the environment around the laser scanner by emitting a rotating laser beam and detecting the laser beam as it is reflected back from the various objects in its path. Laser scanners typically collect a variety of data points with respect to the environment, including distance information for each object in its surrounding environment, a grey scale value (i.e., a measure of the intensity of light) for each distance measurement value, and coordinates (e.g., x, y, and z) for each distance measurement value. This scan data is collected, stored and sent to a processor that is typically remote from the laser scanner, where the data is processed to generate a three dimensional (3D) scanned image of the scanned environment with measurements. In order to generate the 3D scanned image, at least four values (x, y, z coordinates and grey scale value) are collected for each scanned data point.

Many contemporary laser scanners also include a camera mounted on the laser scanner for gathering digital images of the environment and for presenting the digital images to an operator of the laser scanner. The images can be oriented together with the scanned data to provide a more realistic image of the object being scanned. By viewing the images, the operator of the scanner can determine the field of view of the scanned data, and can adjust the settings on the laser scanner if the field of view needs adjusting. In addition, the digital images may be transmitted to the processor to add color to the 3D scanned image. In order to generate a 3D color scanned image, at least six values (x, y, z coordinates; and red value, green value, blue value or "RGB") are collected for each data point. Examples of laser scanners are disclosed in U.S. Pat. No. 7,193,690 to Ossig et al.; U.S. Pat. No. 7,430,068 to Becker et al.; and U.S. Published Patent Application No. US2010/0134596 to Becker; each being incorporated by reference herein.

Another type of coordinate measurement device is a laser tracker, which measures the 3D coordinates of a certain point by sending a laser beam to the point, where the laser beam is typically intercepted by a retroreflector target. The laser tracker finds the coordinates of the point by measuring the distance and the two angles to the target. The distance is measured with a distance-measuring device such as an absolute distance meter (ADM) or an interferometer. The angles are measured with an angle-measuring device such as an angular encoder. A gimbaled beam-steering mechanism within the instrument directs the laser beam to the point of interest. The retroreflector may be moved manually by hand, or automatically, over the surface of the object. The laser tracker follows the movement of the retroreflector to measure the coordinates of the object. Exemplary laser trackers are disclosed in U.S. Pat. No. 4,790,651 to Brown et al., incorporated by reference herein; and U.S. Pat. No. 4,714,339 to Lau et al. The total station, which is most often used in surveying applications, may be used to measure the coordinates of diffusely scattering or retroreflective targets. The total station is closely related to both the laser tracker and the scanner.

A common type of retroreflector target is the spherically mounted retroreflector (SMR), which comprises a cube-corner retroreflector embedded within a metal sphere. The cube-corner retroreflector comprises three mutually perpendicular mirrors. The apex of the cube corner, which is the common point of intersection of the three mirrors, is located at the center of the sphere. It is common practice to place the spherical surface of the SMR in contact with an object under test and then move the SMR over the surface of the object being measured. Because of this placement of the cube corner within the sphere, the perpendicular distance from the apex of the cube corner to the surface of the object under test remains constant despite rotation of the SMR. Consequently, the 3D coordinates of the object's surface can be found by having a tracker follow the 3D coordinates of an SMR moved over the surface. It is possible to place a glass window on the top of the SMR to prevent dust or dirt from contaminating the glass surfaces. An example of such a glass surface is shown in U.S. Pat. No. 7,388,654 to Raab et al., incorporated by reference herein.

A gimbal mechanism within the laser tracker may be used to direct a laser beam from the tracker to the SMR. Part of the light retroreflected by the SMR enters the laser tracker and passes onto a position detector. The position of the light that hits the position detector is used by a tracker control system to adjust the rotation angles of the mechanical azimuth and zenith axes of the laser tracker to keep the laser beam centered on the SMR. In this way, the tracker is able to follow (track) the SMR as it is moved.

Angular encoders attached to the mechanical azimuth and zenith axes of the tracker may measure the azimuth and zenith angles of the laser beam (with respect to the tracker frame of reference). The one distance measurement and two angle measurements performed by the laser tracker are sufficient to completely specify the three-dimensional location of the SMR.

As mentioned, two types of distance meters may be found in laser trackers: interferometers and absolute distance meters (ADMs). In the laser tracker, an interferometer (if present) may determine the distance from a starting point to a finishing point by counting the number of increments of known length (usually the half-wavelength of the laser light) that pass as a retroreflector target is moved between the two points. If the beam is broken during the measurement, the number of counts cannot be accurately known, causing the distance information to be lost. By comparison, the ADM in a laser tracker determines the absolute distance to a retroreflector target without regard to beam breaks, which also allows switching between targets. Because of this, the ADM is said to be capable of "point-and-shoot" measurement. Initially, absolute distance meters were only able to measure stationary targets and for this reason were always used together with an interferometer. However, some modern absolute distance meters can make rapid measurements, thereby eliminating the need for an interferometer. Such an ADM is described in U.S. Pat. No. 7,352,446 to Bridges et al., incorporated by reference herein. The distances measured by interferometers and absolute distance meters are dependent on the speed of light through air. Since the speed of light varies with air temperature, barometric pressure, and air humidity, it is common practice to measure these quantities with sensors and to correct the speed of light in air to obtain more accurate distance readings. The distances measured by total stations and scanners also depend on the speed of light in air.

In its tracking mode, the laser tracker automatically follows movements of the SMR when the SMR is in the capture range of the tracker. If the laser beam is broken, tracking will stop. The beam may be broken by any of several means: (1) an obstruction between the instrument and SMR; (2) rapid movements of the SMR that are too fast for the instrument to follow; or (3) the direction of the SMR being turned beyond the acceptance angle of the SMR. By default, following the beam break, the beam may remain fixed at the point of the beam break, at the last commanded position, or may go to a reference ("home") position. It may be necessary for an operator to visually search for the tracking beam and place the SMR in the beam in order to lock the instrument onto the SMR and continue tracking.

Some laser trackers include one or more cameras. A camera axis may be coaxial with the measurement beam or offset from the measurement beam by a fixed distance or angle. A camera may be used to provide a wide field of view to locate retroreflectors. A modulated light source placed near the camera optical axis may illuminate retroreflectors, thereby making them easier to identify. In this case, the retroreflectors flash in phase with the illumination, whereas background objects do not. One application for such a camera is to detect multiple retroreflectors in the field of view and measure each retroreflector in an automated sequence. Exemplary systems are described in U.S. Pat. No. 6,166,809 to Pettersen et al., and U.S. Pat. No. 7,800,758 to Bridges et al., incorporated by reference herein.

Some laser trackers have the ability to measure with six degrees of freedom (DOF), which may include three coordinates, such as x, y, and z, and three rotations, such as pitch, roll, and yaw. Several systems based on laser trackers are available or have been proposed for measuring six degrees of freedom. Exemplary systems are described in U.S. Pat. No. 7,800,758 to Bridges et al., U.S. Pat. No. 5,973,788 to Pettersen et al., and U.S. Pat. No. 7,230,689 to Lau.

It is desirable to provide a laser scanner or a laser tracker with one or more projectors, with each projector projecting visual information in the form of images and/or data (e.g., CAD data or scanned point cloud data) onto various surfaces. The projected visual information may, for example, be of a type such as to provide guidance to an operator, such as written instructions, highlighted points to be measured, indicated areas where data are to be taken, and real time feedback on the quality of the data.

SUMMARY OF THE INVENTION

According to an aspect of the present invention, a laser scanner includes a light source that emits a light beam within an environment, and a data capture component that captures the light beam reflected back to the laser scanner from the environment. The laser scanner also includes a projector integrated within a body of the laser scanner or mounted to the body of the laser scanner at a predetermined location, the projector being operable to project visible information onto an object located within the environment, the projected visible information being indicative of images, data or information, the projected visible information being at least one of design intent information, information acquired by the laser scanner, or guidance to an operator.

According to another aspect of the present invention, a laser tracker includes a light source that emits a light beam towards a target located within an environment, and a data capture component that captures the light beam reflected back to the laser scanner from the target located within the environment. The laser tracker also includes a projector integrated within a body of the laser tracker or mounted to the body of the laser tracker at a predetermined location, the projector being operable to project visible information onto an object located within the environment, the projected visible information being indicative of images, data or information, the projected visible information being at least one of design intent information, information acquired by the laser tracker, or guidance to an operator.

BRIEF DESCRIPTION OF THE DRAWINGS

Referring now to the drawings, exemplary embodiments are shown which should not be construed to be limiting regarding the entire scope of the disclosure, and wherein the elements are numbered alike in several FIGURES.

DETAILED DESCRIPTION OF THE PREFERRED EMBODIMENTS

Figure 1:
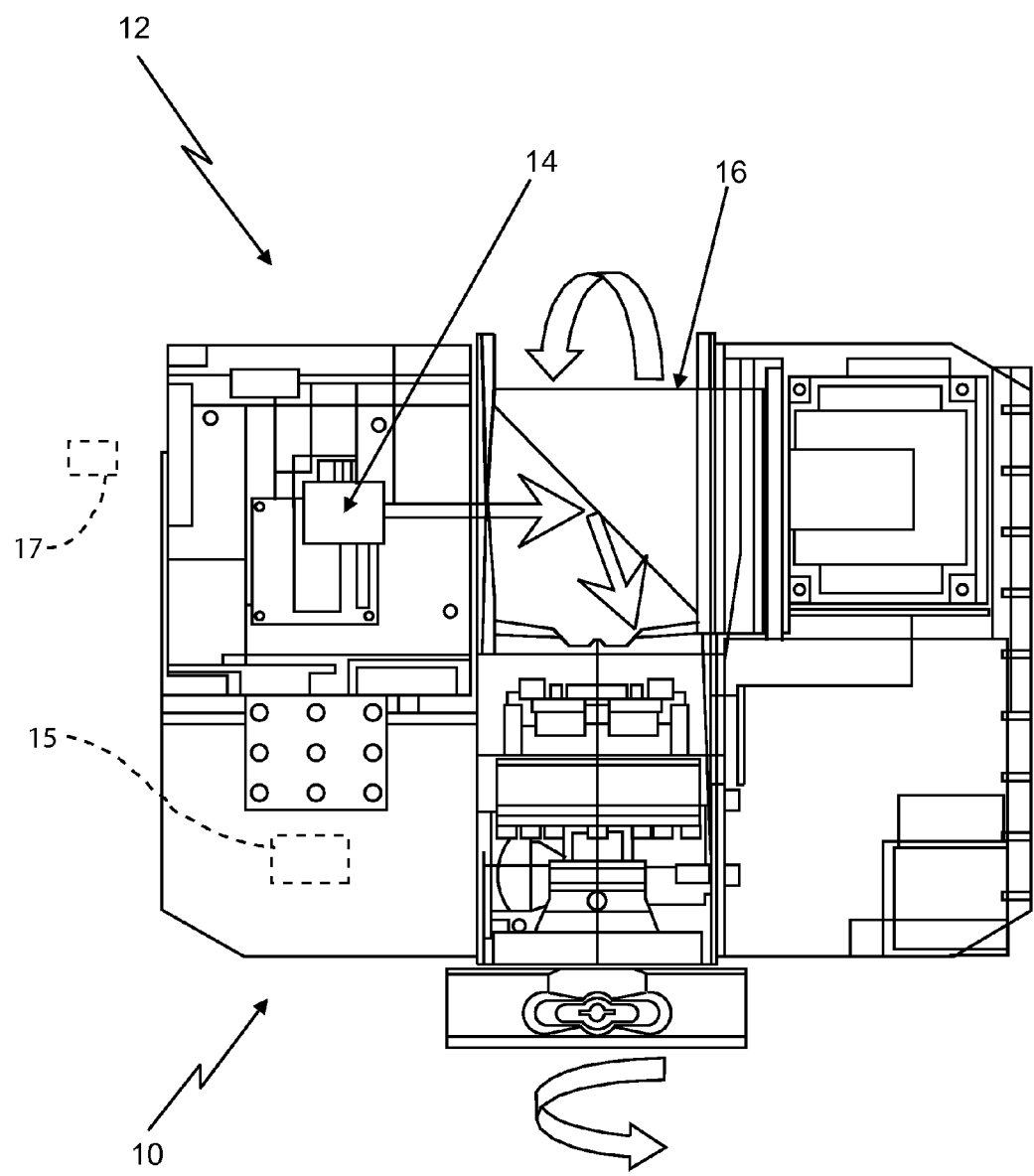
FIG. 1 is a front cross sectional view of a head portion of a laser scanner having a projector integrated therein in accordance with embodiments of the present invention.

Referring to FIG. 1, in accordance with embodiments of the present invention, there illustrated is a rotating scanning head portion 10 of a laser scanner 12 having a commercially available, relatively small or "miniature," "ultraminiature," or "pico" projector 14 integrated directly within the optical components ("optics") located within the scanner head 10. The projector 14 may contain some amount of processing capability, as is known. The projector 14 may be connected with, or in communication with, a first computer or processor 15 of the laser scanner 12, where the computer or processor may be integral with the scanner 12 (e.g., located within the scanner head 10) or may be a second separate computer or processor 17 therefrom (e.g., a laptop computer). The scanner head 10 is typically mounted to a supporting tripod (not shown), which sits on the ground or other surface during laser scanner use. As described in more detail with respect to FIG. 2, the projector 14 sends various images, data or other information through the optics within the scanner head 10 and onto a rotating scanning mirror 16 that typically rotates relatively quickly through 360 degrees about a horizontal axis through the head 10, wherein the mirror 16 projects the images, data or other information towards a surface (not shown) for viewing. The scanner head 10 itself may rotate relatively more slowly through 360 degrees about a vertical axis through the head 10.

Various embodiments of the present invention include the integration or addition of such a relatively small image or data projector into equipment generally used for 3D measurement or metrology, including but not limited to, a laser scanner, laser tracker, white light scanner or similar type technological device or instrument. In embodiments of the present invention, the projector may be integrated within the laser scanner 12 or laser tracker, and the projected images, data or other information are controlled using data or information from the measurement equipment 12 itself, data or information previously captured by the measurement equipment 12, or data or information from some other source. As described in detail hereinafter, the projected images or data provide visualization of various types of information that is useful during a measurement session, or the projected images or data can assist in visualization of data previously taken by the equipment 12. The projected visual information may, for example, be of a type such as to provide guidance to an operator, such as written instructions, highlighted points to be measured, indicated areas where data are to be taken, and real time feedback on the quality of the data. This visual information provided to the operator may, for example, be in the form of visual cues, text or some other visual form of information.

Further, the projector may comprise one or more commercially available galvanometers or polygon scanners rather than one of the types of projectors mentioned herein above, for example, a miniature, ultraminiature, or pico-projector which might be based, for example, on microelectromechanical systems (MEMS) technology, liquid crystal display (LCD) or liquid crystal on silicon (LCOS) technology. For example, typically two galvanometers or two polygon scanners are used with associated mirrors to project the desired image, data, or information, in a desired pattern in two dimensions onto the surface of interest. In the case of a laser scanner 12, the galvanometer mirrors project the images or other information onto the rotating mirror where they are reflected off of towards the object of interest. The rotation of the main mirror in the laser scanner 12 and the rotation of the galvanometer mirror also in the laser scanner 12 creating the image or other projected information would be synchronized. As such, the laser scanner creates the images in the same way that images are generated for laser light shows. In the case of a laser tracker (discussed in more detail hereinafter), the galvanometer mirrors would project the images or other information directly onto the target of interest. The size of the pattern projected by a projector disposed on the tracker may be expanded by moving the tracker head to cover a relatively large area while, at the same time, dynamically changing the pattern from the projector to produce the desired image over a relatively large region of space. This way, the head of the laser tracker acts like a galvanometer mirror. When used, the galvanometers or polygon scanners may provide a relatively more powerful, brighter and more efficient laser beam for image or data projection purposes as compared to the light from a pico projector.

In many cases, it is advantageous to provide a focusing mechanism to make the projected image as sharp as possible on the surface of the object to which the two-dimensional pattern is projected. The focusing mechanism will generally include a mechanical actuator for moving one or more lenses.

With MEMS, LCD, LCOS, and other types of pico-projectors, it is common today to provide color projection patterns. Color may be used advantageously in providing information about an object.

Laser scanners and laser trackers frequently employ optics, sensors, mirrors, and/or laser sources mounted to motors and/or gimbals such that the scanner or tracker instrument or device 12 can automatically scan a large area or object or track a movable target (e.g., a retroreflector) within the working volume of the device 12 without the need to manually aim or move the sensor modules of the device 12.

Figure 2:
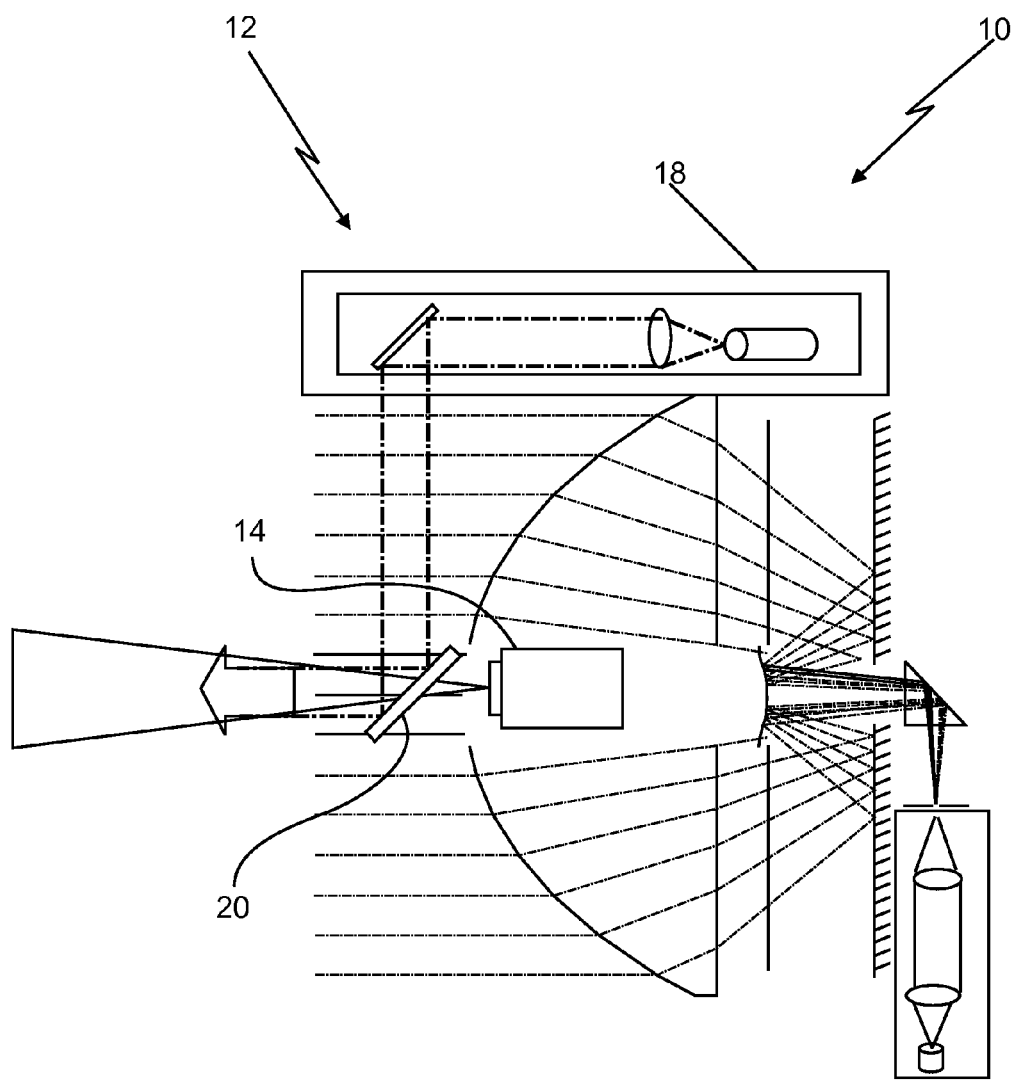
FIG. 2 is an optical schematic view of the head portion of a laser scanner of FIG. 1 having a projector integrated therein in accordance with embodiments of the present invention.

Referring to FIG. 2, in some embodiments of a laser scanner 10, the laser light emitted from a laser light source 18 can be directed through use of a mirror 20. Techniques are known that allow the reflective surface of a mirror 20 to be coated in such a way (e.g., "dichroic" coating) as to reflect light at the wavelength of the source laser 18 while passing light of other wavelengths. Such embodiments allow a miniature projector 14 to be mounted behind an angled mirror 20 that reflects the laser beam emitted from the laser 18 to the rotating scanning mirror 16 (FIG. 1). In the embodiment shown in FIG. 2, the motors, encoders and drive circuitry used to point the laser beam also simultaneously direct the beam of the projector 14 via the scanning mirror 16 (FIG. 1).

Thus, in some embodiments, the computer or processor associated with the laser scanner 12 may be required to perform some mathematical calculations to correctly locate the image or data from the projector 14 onto the rotating scanning mirror 16. These calculations should be apparent to one of ordinary skill in the art. That is, the projected image or data is compensated for to account for the rotation of the mirror 16 so that the image or data is not distorted or smeared. For example, the image projected by the projector 14 onto the mirror 16 may be changed dynamically to provide an image that is stationary on a projection surface (e.g., a wall). The mirror 16 typically is made to rotate, in part, for laser safety reasons. In alternative embodiments, the laser that provides the laser beam to the rotating scanning mirror 16 for metrology purposes may be turned off, the mirror 16 may be held in a stationary position, and then the projector 14 may provide the relatively weaker light that comprises the image or data to the mirror 16. In these embodiments, no mathematical corrections for the now stationary mirror 16 are typically needed. In some cases, the size of the image projected onto the reflective surface of the mirror 16 is adjusted according to the distance from the scanner to the projection surface. This would be the case, for example, if the projector were to emit a diverging pattern of light and if the image on the projection surface were intended to have a fixed size. In this case, the distance measuring capability of the scanner may provide the information needed to enable the projector 14 to correctly size the projected image.

The image, data or other information projected from the projector 14 onto the surface of interest may have its timing controlled such that the image, data or other information may be mechanically or electronically strobed to coincide with certain angles of the rotating scanning mirror 16. Also, the laser beam used by the scanner 12 for metrology purposes may be provided in a mutually exclusive manner (e.g., multiplexed) with respect to the image, data or other information provided from the projector 14. That is, the laser beam and the projected light pattern or data may not be "on" (i.e., projected) at the same time, as that condition may not be necessary. Alternatively, the laser beam and the projected light pattern may be on at the same time. Typically, the projecting mode of the laser scanner 12, according to embodiments of the present invention, is not tied to or dependent upon the scanning mode of the scanner 12.

Figure 3:
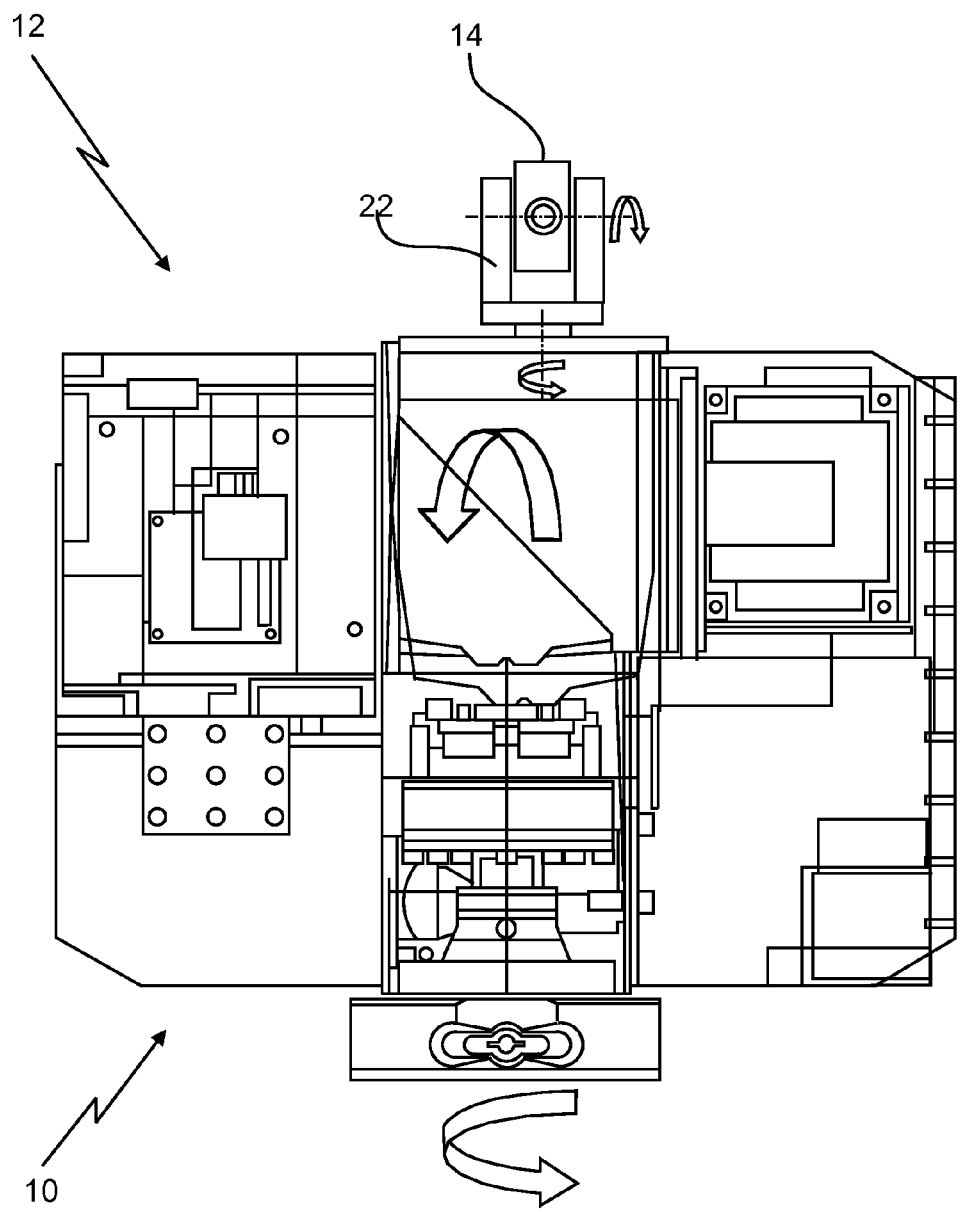
FIG. 3 is a front cross sectional view of a head portion of a laser scanner having a projector externally mounted to the head portion in accordance with embodiments of the present invention.

Referring to FIG. 3, in other embodiments of the present invention, the projector 14 can be mounted to multi-axis, motorized gimbals 22, for example, on top of the laser scanner head 10, as an alternative to being installed in-line with the measurement optics of the laser scanner 12 as in the embodiments of FIGS. 1 and 2. This allows the projection system 14 to be added to existing laser scanner equipment 12 that may not support the full integration embodiments of FIGS. 1 and 2. The embodiment of FIG. 3 may in some situations be simpler and less expensive to implement. In such an embodiment, the gimbals 22 upon which the projector 14 is mounted may be driven and aimed in synchronization with the optics of the 3D measurement device 12, thus assuring that the projector image is pointed to the same area that is of interest in taking measurements by the laser scanner 12. This has advantages when using the projector 12 for guidance or data presentation. Alternately, the independently mounted projector 14 may be commanded to project images in an area different than the primary device optics.

The position and orientation of a 3D metrology device such as a 3D laser scanner 12 or laser tracker relative to an object, part or structure to be measured may be established by identification of reference points or part or object features using known techniques. Once the coordinate system has been established, both the 3D metrology device (e.g., the laser scanner) 12 and the projector 14 can be synchronized and controlled with a relatively high degree of precision by an external computer connected to the device 12 as part of the device 12, or an on-board computer as part of the device 12 that can process the device position and control the orientation of the device optics. This allows the projected image to be shaped, scaled and controlled to match the surface onto which it projected, and it allows the image to update as the direction of the projector 14 changes such that it is always synchronized and locked to the environment.

Figure 4A:
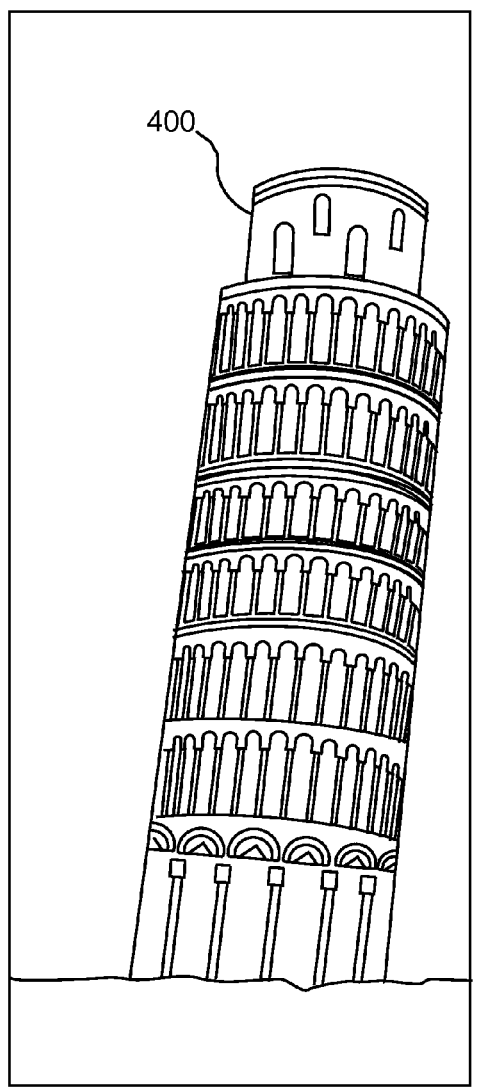
FIG. 4 are two views showing visualization of movement over time of the Tower of Pisa using a projected image of the Tower of Pisa earlier in time utilizing the laser scanner having the projector according to the embodiments of FIGS. 1-3.
Figure 4B:
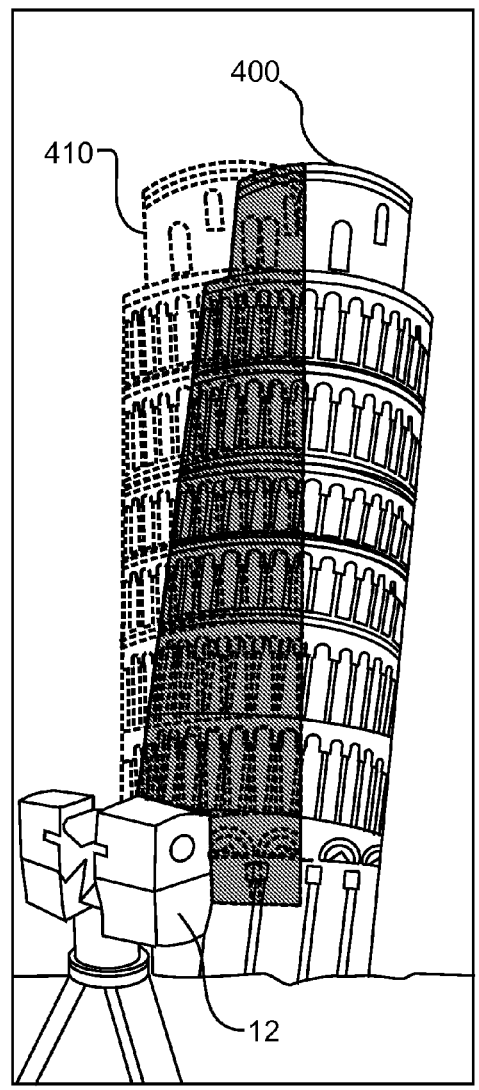

Various implementations or usages of a projector 14 integrated within, or mounted to, a computer controlled 3D measurement device such as a laser scanner 12 according to embodiments of the present invention include, but are not limited to, projecting data, text, instructions, images or guidance in the form of, for example, visual cues or text or other forms of information on the surface of a part to be measured. They may also include providing a projected overlay of previously scanned/measured data or CAD data showing design intent for visualization of changes to a part or parameters. For 3D scanned data this may include: (1) comparison of a car body before and after an accident or before and after repair; (2) comparison of the CAD design of a planned equipment installation compared to the actual completed installation; (3) visualization of a proposed change to a part, equipment setup, assembly line, wall, or building; (4) visualization of a part design compared to a drawing as a method of inspection; (5) visualization of hidden features (FIG. 5) such as studs, piping, electrical wiring and duct works behind a wall, ceiling or floor by projecting CAD data of the design, or scans taken during construction, onto the visible surface; (6) visualization of elements beneath the skin of the human or animal body by projecting an image of a 3D CAT scan, 3D X-ray or other 3D diagnostic data onto the body, which can provide visual assistance in locating organs, tumors, blood vessels, bones, or other physiological features as part of a surgical procedure; (7) visualization of crime scenes, before and after; (8) projection of contour maps onto a part, thereby indicating regions of the part that need to be removed, for example, by filing, sanding, or lapping, or filled in, for example, with epoxy filler; (9) projection of marks indicating areas in which subcomponents should be attached to the object, for example, with bolts, screws, or adhesive; (10) projection of lines, curves, marks, or fiducial features for aid in aligning of components; and (11) visualization of degradation or movement over time (via sequential scans) of archaeological sites, historic buildings, bridges, railways, roads, and other facilities that are subject to wear, settling, decomposition, weathering, or general deterioration over time, as illustrated, for example, in FIG. 4, which can be extended to the examination and visualization of wear and damage to large vehicles like ships, aircraft, spacecraft (e.g. space shuttle tiles). Specifically, the sole view 400 in FIG. 4A and the right hand leaning view 400 in FIG. 4 shows the Tower of Pisa tilted to the right side as viewed in FIGS. 4A and 4B, and also having a upright vertical image 410 of the Tower (shown in dotted lines in FIG. 4B) projected (in part) onto the leaning tower view 400 in FIG. 4B by the laser scanner 12 having the projector 14, according to various embodiments of the present invention. This illustrates the amount of movement or "tilt" to the right of the Tower of Pisa over time. Note that normally one would not see the left-hand (dotted line) portion of the upright vertical image 410 of the Tower since it would not be projected onto the tilted Tower nor would be projected onto any other surface. That is, this dotted line left-hand portion of the upright vertical image 410 of the Tower would be projected in free space. Instead, one would normally only see the shaded or filled in right-hand portion of the upright vertical image 410 projected onto the Tower 400. In FIG. 4B the entire upright vertical image 410 of the Tower is shown for exemplary purposes only.

To further extend the usefulness of the controlled projected image, multiple projectors 14 may be incorporated into a single device such as a laser scanner 12. This allows for a potential increase in the range of image coverage, ultimately to 360 degrees around the scanning device, with the possible exception of relatively small areas blocked by the laser scanner itself (e.g., at the location where the scanner head 10 attaches to the tripod).

In other embodiments of the present invention, synchronized images may be generated by multiple projectors 14 mounted independently of the laser scanner 12 or laser tracker, for example, on gimbaled computer controlled mounts or in fixed positions measured and known to the laser scanner 12 or tracker. In these embodiments, each projector 14 may be controlled by the laser scanner 12 or tracker, or by a computer attached to the laser scanner 12 or tracker and used to establish the coordinate system of the area. These embodiments may provide for relatively broader simultaneous coverage by the projected images while also supporting image projection in areas that might otherwise be blocked by equipment or features, including by the laser scanner 12 itself. Images projected by this array of projectors 14 can then be managed and controlled by the central computer or laser scanner 12 or other metrology device such that the projected images or data or other information is scaled, sized and properly aligned to the objects in the environment. For example, the projector 14 projects images, data or other information that is related to the direction and/or orientation that the laser scanner 14 is currently pointed to. As an example, the movement of a person or other object may be tracked by the laser scanner 14 and then images or data may be projected by the laser scanner 12 with the projector 14 according to the position and/or orientation of that person or object.

Embodiments of the present invention may be applied to any computer controlled aiming system that can establish a baseline coordinate system on a part or in an environment such that projected images can be aligned with the surface onto which they are projected. Other embodiments of the present invention may be utilized for entertainment purposes and may comprise, for example, projecting a movie on the surrounding walls of a room. For example, if a moving object (e.g., a person) can be tracked within a stationary environment, then the projected images within the environment can be automatically adjusted as a function of, for example, the person's movement, actions, or head orientation. This involves console gaming and virtual reality technologies. However, the 3D space reconstruction is different than the 2D gaming technologies. As an example, a system may have a laser scanner or tracker detect and follow a person walking around building, all the while projecting information on the wall that a person looks at. The projector cannot cover 360 degrees of space, but it can selectively project where someone is looking at, which gives the perception of projection over 3D space.

Figure 5:
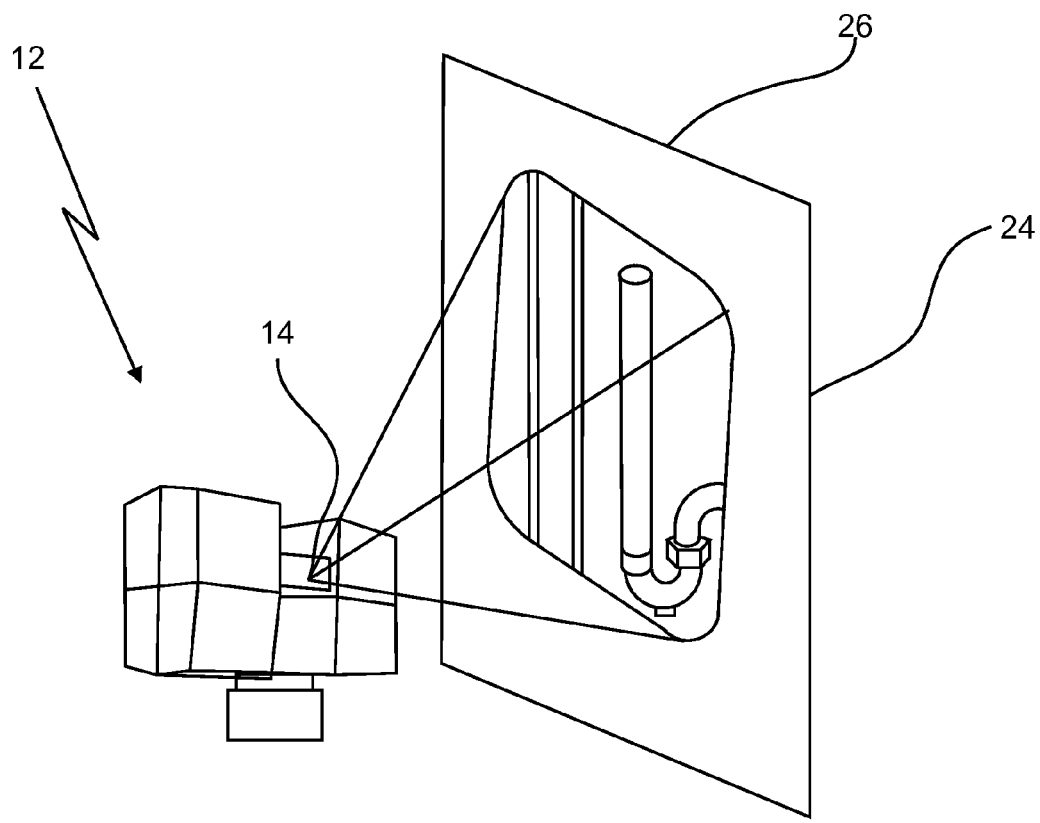
FIG. 5 shows a laser scanner with a projector according to embodiments of the present invention projecting "hidden features" onto a surface such as a wall.

Referring to FIG. 5, there illustrated is a laser scanner 12 having a projector 14 according to embodiments of the present invention in which the projector 14 projects "hidden features" 24 onto a surface such as a wall 26. The hidden features may include objects such as, for example, studs, piping, electrical wiring and duct works that are located behind the wall 26, ceiling, floor or other visible surface. A worker may not know what is exactly positioned behind the wall surface 26 and/or does not know the exact positioning of these items behind the wall surface 26. It would be beneficial to provide the worker with an image of the items behind the wall surface 22 and the exact location of those items. Generally, this information about the hidden features is available as, e.g., CAD design data.

The projection of hidden features according to embodiments of the present invention may come about, for example, by first scanning a building such as a home using a laser scanner 12 during various construction phases (e.g., framing, wiring, plumbing, HVAC, etc.) to obtain scanned point cloud data of various structural details of the building. After completion of certain phases of the scanning to collect images and data, the laser scanner 12 with the projector 14 may then be used to project various "real" images and/or data obtained from the scanning process onto the walls, ceiling, floors, etc. Alternatively, CAD design "intent" data of the various surfaces of the building may be projected onto the surfaces. Regardless of whether real or intended images and/or data are projected, the projection of the hidden features onto these surfaces may assist someone in carrying out tasks, such as, for example, drilling a hole in a precise location of a stud behind a wall. These embodiments of the present invention allow a user of the laser scanner 12 with the projector 14 to identify the precise location of these objects or features such that no harm is caused to other objects or that no time is wasted trying to locate these hidden objects or features.

Similar to the embodiments illustrated in FIG. 5, the hidden features may comprise those within a human body that are covered by skin. For example, the projector 14 may project data onto the patient's skin to assist a doctor or surgeon in precisely locating internal human body parts to be accessed and/or surgically operated on. In an operating room, for example, a doctor may use a laser scanner 12 having a projector 14 to determine a precise location for making an incision or finding a tumor, correlating this location with 3D Computer Axial Tomography (CAT) data. In this case, the projector 14 may project an image on the patient, providing markers or actual replication of CAT scan imagery to guide the surgeon. Surgery performed remotely by manually operated robots may use such projection systems 14 in the same way as described above.

Besides displaying hidden components, for example, in a construction area or in an engineering device, the projector may display regions as they would appear following attachment. For example, before the wall surface 26 was in place in FIG. 5 and before the pipes and other construction elements were installed behind the wall surface 26, a scanner could display the desired appearance of the area, thereby providing guidance to the builder.

Figure 6:
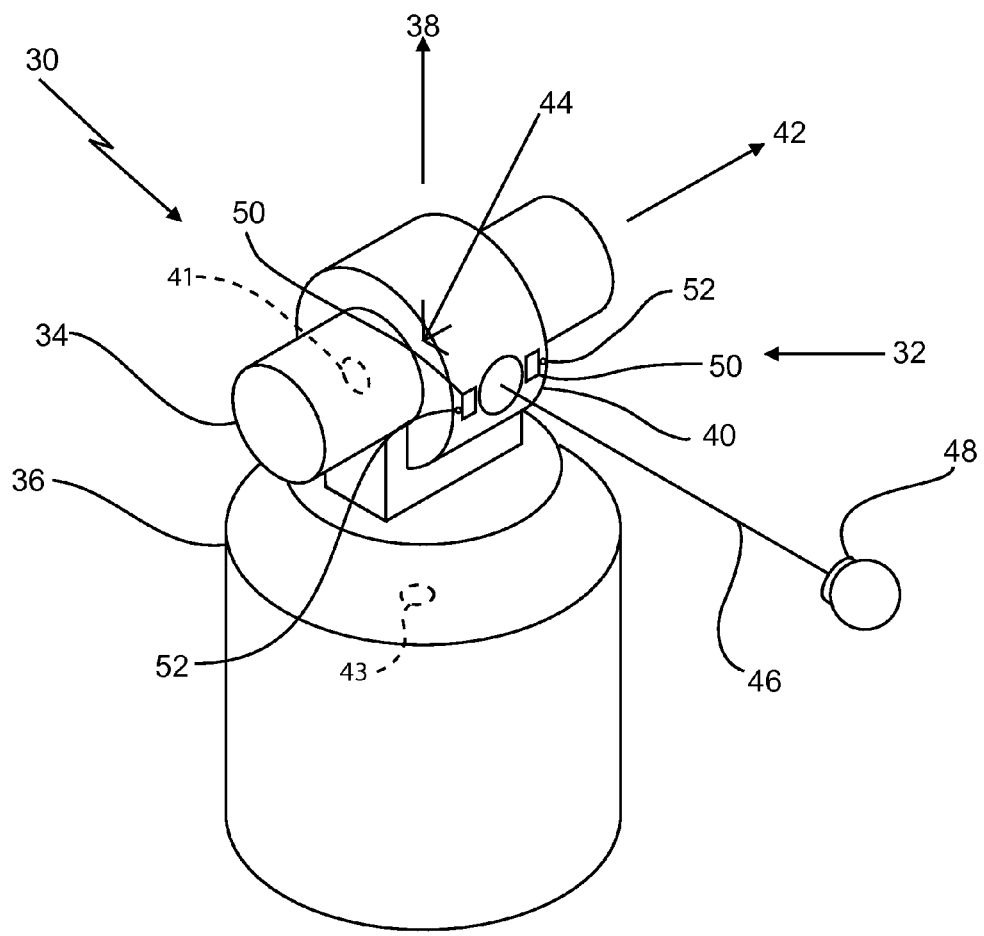
FIG. 6 is a perspective view of a laser tracker having a projector integrated therein in accordance with embodiments of the present invention.

Referring now to FIGS. 6-11, there illustrated are embodiments of a laser tracker 30 having a projector integrated therein or mounted thereto, according to another aspect of the present invention. In FIG. 6, the laser tracker 30 includes a gimbaled beam-steering mechanism 32 that comprises a zenith carriage 34 mounted on an azimuth base 36 and rotated about an azimuth axis 38. A payload 40 is mounted on the zenith carriage 34 and is rotated about a zenith axis 42. The zenith mechanical rotation axis 42 and the azimuth mechanical rotation axis 38 intersect orthogonally, internally to the tracker 30, at a gimbal point 44, which is typically the origin for distance measurements. A laser beam 46 virtually passes through the gimbal point 44 and is pointed orthogonal to the zenith axis 42. In other words, the laser beam 46 is in the plane normal to the zenith axis 42. The laser beam 46 is pointed in the desired direction by motors located within the tracker 30 that rotate the payload 40 about the zenith axis 42 and the azimuth axis 38. Zenith and azimuth angular encoders (not shown) or transducers 41, 43, located internal to the tracker 30, are attached to the zenith mechanical axis 42 and to the azimuth mechanical axis 38, and indicate, to a relatively high degree of accuracy, the angles of rotation. The laser beam 46 travels to an external retroreflector 48 such as a spherically mounted retroreflector (SMR). By measuring the radial distance between the gimbal point 44 and the retroreflector 48 and the rotation angles about the zenith and azimuth axes 42, 38, the position of the retroreflector 48 is found within the spherical coordinate system of the tracker 30.

The laser beam 46 may comprise one or more laser wavelengths. For the sake of clarity and simplicity, a steering mechanism of the type shown in FIG. 6 is assumed in the following discussion. However, other types of steering mechanisms are possible. For example, it may be possible to reflect a laser beam off a mirror rotated about the azimuth and zenith axes 38, 42. An example of the use of a mirror in this way is disclosed in U.S. Pat. No. 4,714,339 to Lau et al. The techniques described here are applicable, regardless of the type of steering mechanism utilized.

In the laser tracker 30, one or more cameras 50 and light sources 52 are located on the payload 40. The light sources 52 illuminate the one or more retroreflector targets 48. The light sources 52 may be LEDs electrically driven to repetitively emit pulsed light. Each camera 50 may comprise a photosensitive array and a lens placed in front of the photosensitive array. The photosensitive array may be a CMOS or CCD array. The lens may have a relatively wide field of view, for example, thirty or forty degrees. The purpose of the lens is to form an image on the photosensitive array of objects within the field of view of the lens. Each light source 52 is placed near a camera 50 so that light from the light source 52 is reflected off each retroreflector target 48 onto the camera 50. In this way, retroreflector images are readily distinguished from the background on the photosensitive array as their image spots are brighter than background objects and are pulsed. In an embodiment, there are two cameras 50 and two light sources 52 placed symmetrically about the line of the laser beam 46. By using two cameras 50 in this way, the principle of triangulation can be used to find the three-dimensional coordinates of any SMR 48 within the field of view of the camera 50. In addition, the three-dimensional coordinates of the SMR 48 can be monitored as the SMR 48 is moved from point to point. A use of two cameras for this purpose is described in U.S. Published Patent Application No. US20100128259 to Bridges.

Other arrangements of one or more cameras 50 and light sources 52 are possible. For example, a light source 52 and a camera 50 can be coaxial or nearly coaxial with the laser beams 46 emitted by the tracker 30. In this case, it may be necessary to use optical filtering or similar methods to avoid saturating the photosensitive array of the camera 50 with the laser beam 46 from the tracker 30.

Another possible arrangement is to use a single camera 50 located on the payload or base 40 of the tracker 30. A single camera 50, if located off the optical axis of the laser tracker 30, provides information about the two angles that define the direction to the retroreflector 48 but not the distance to the retroreflector 48. In many cases, this information may be sufficient. If the 3D coordinates of the retroreflector 48 are needed when using a single camera 50, one possibility is to rotate the tracker 30 in the azimuth direction by 180 degrees and then to flip the zenith axis 42 to point back at the retroreflector 48. In this way, the target 48 can be viewed from two different directions and the 3D position of the retroreflector 48 can be found using triangulation.

Another possibility is to switch between measuring and imaging of the target 48. An example of such a method is described in international application WO 03/062744 to Bridges et al. Other camera arrangements are possible and can be used with the methods described herein.

Figure 7:
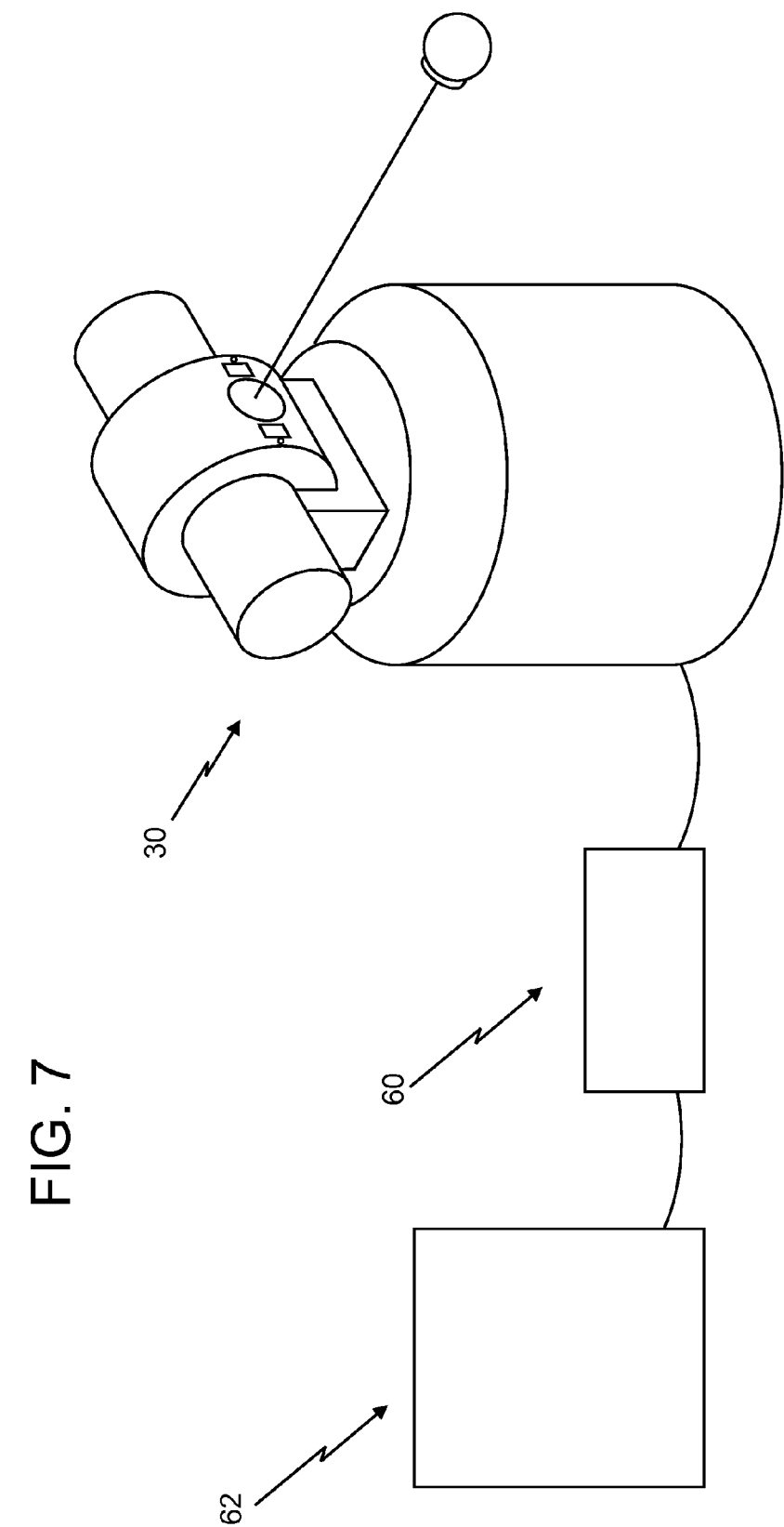
FIG. 7 is a perspective view of the laser tracker of FIG. 6 having computing and power supply elements attached thereto.

As shown in FIG. 7, an auxiliary unit 60 is usually a part of the laser tracker 30. The purpose of the auxiliary unit 60 is to supply electrical power to the laser tracker body and in some cases to also supply computing and clocking capability to the system. It is possible to eliminate the auxiliary unit 60 altogether by moving the functionality of the auxiliary unit 60 into the tracker body. In most cases, the auxiliary unit 60 is attached to a general purpose computer 62. Application software loaded onto the general purpose computer 62 may provide application capabilities such as reverse engineering. It is also possible to eliminate the general purpose computer 62 by building its computing capability directly into the laser tracker 30. In this case, a user interface, preferably providing keyboard and mouse functionality is built into the laser tracker 30. The connection between the auxiliary unit 60 and the computer 62 may be wireless or through a cable of electrical wires. The computer 62 may be connected to a network, and the auxiliary unit 60 may also be connected to a network. Plural instruments, for example, multiple measurement instruments or actuators, may be connected together, either through the computer 62 or the auxiliary unit 60.

Figure 8:
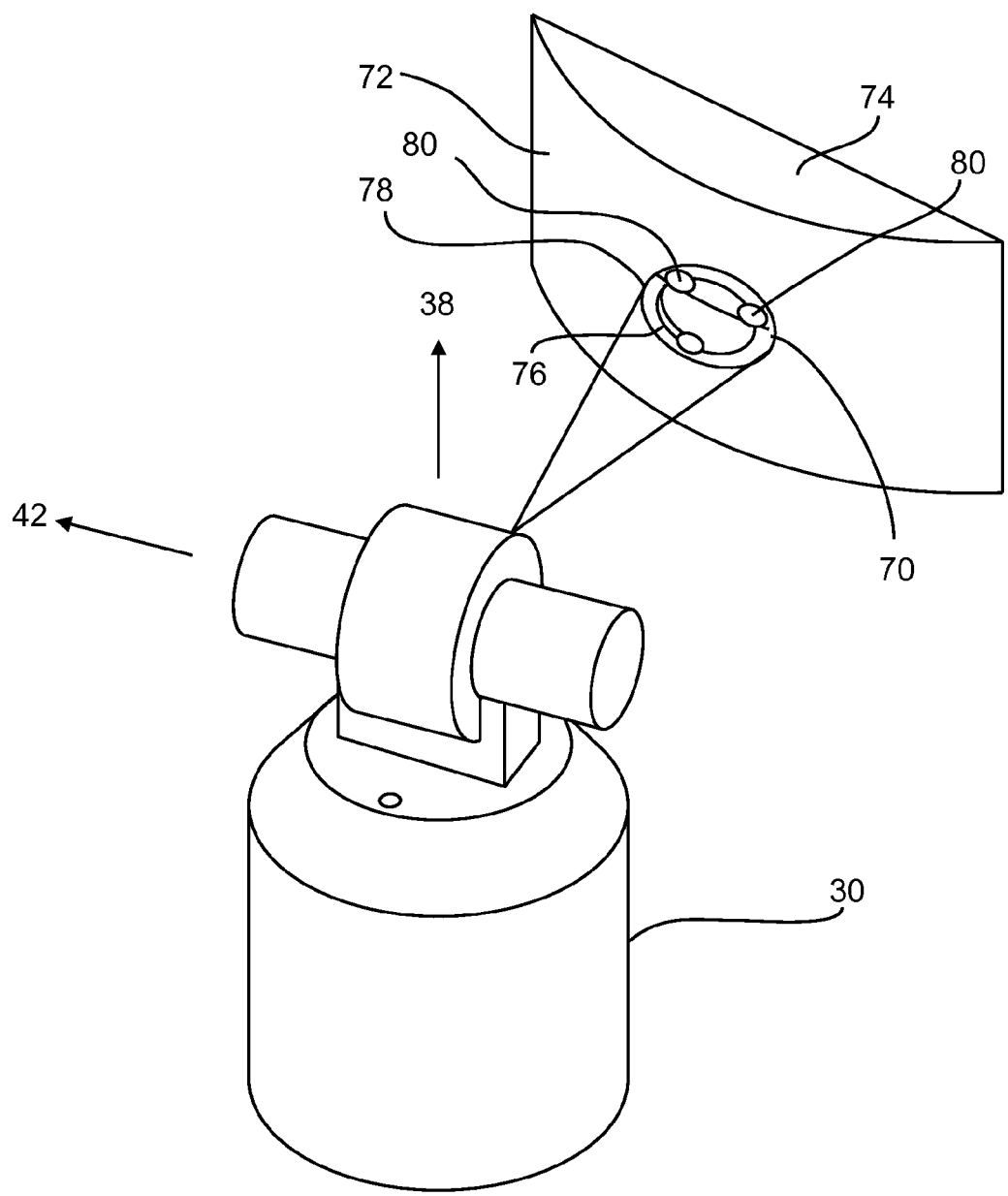
FIG. 8 is a perspective view of the laser tracker of FIG. 6 projecting a pattern onto a surface of an object or workpiece according to embodiments of the present invention.

Referring to FIG. 8, there illustrated is a laser tracker 30 having an internal projector 94 (not shown) integrated within the tracker 30 (FIGS. 9-10) and projecting a pattern 70 onto a surface 72 of an object 74, such as a workpiece. Such a pattern 70 may be used, for example, to highlight the features 76 where measurements with the tracker 30 are to be taken through use of a circle 78, while also overlaying indicators 80 where the measurement device 30 would acquire the measurement points.

Figure 9:
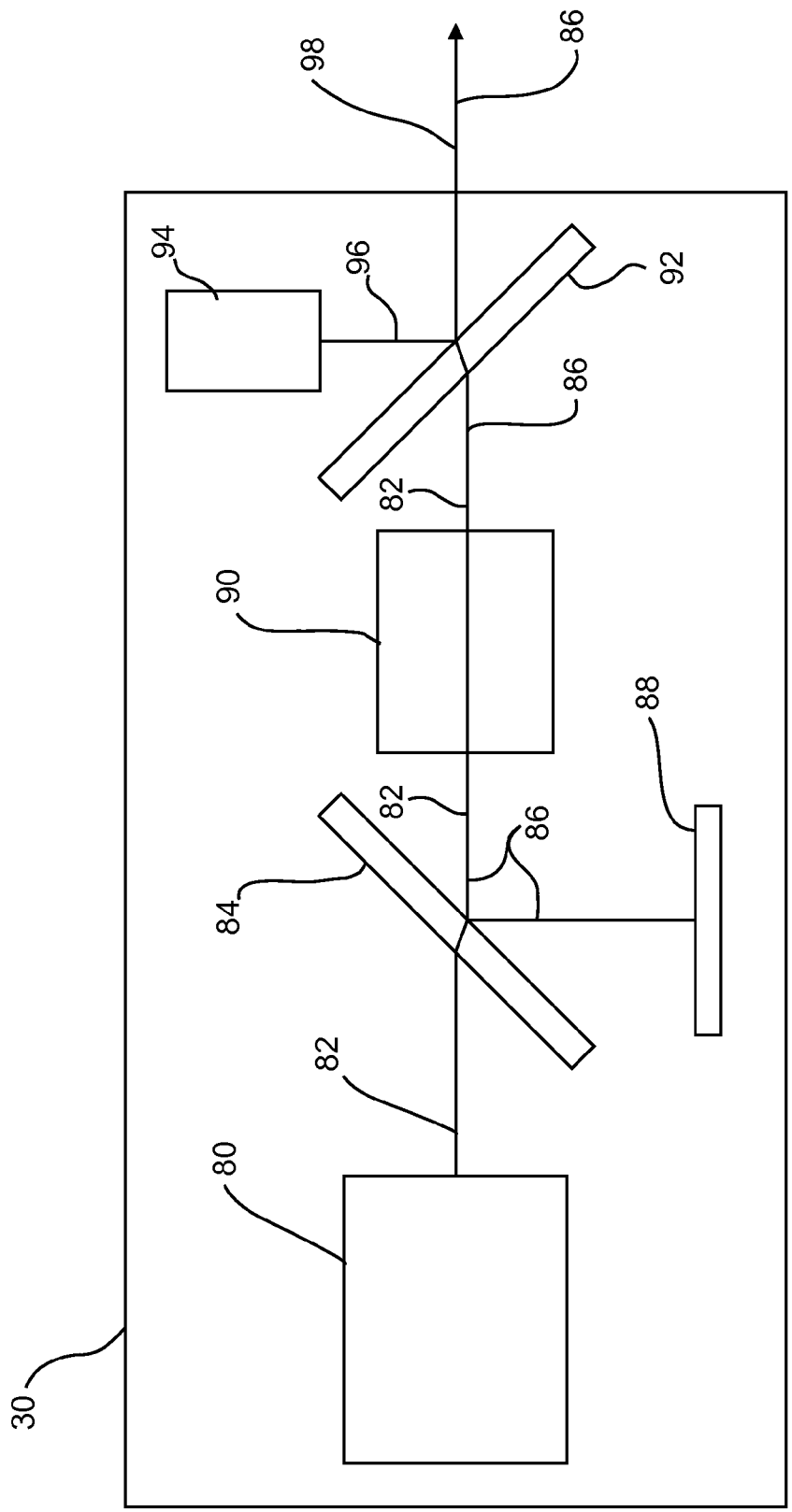
FIG. 9 is a block diagram of various components including a projector within a portion of the laser tracker of FIG. 6 according to embodiments of the present invention.

Referring to FIG. 9, there illustrated are various internal components within the laser tracker 30 of FIG. 6. The components include one or more distance meters 80, which may comprise an interferometer (IFM), an absolute distance meter (ADM), or both. Emitted from the distance meter 80 is one or more laser beams 82, which might be visible or infrared or both. The outgoing laser beam 82 passes through a first beam splitter 84. If the outgoing laser beam 82 is directed to a retroreflector 48 (FIG. 6), then on the return path this retroreflected laser beam 86 bounces off this first beam splitter 84 and travels to a position detector 88. The position of the light on the position detector 88 is used by the control system of the laser tracker 30 to keep the laser outgoing beam 82 centered on the retroreflector 48, thereby enabling the tracking function. If the outgoing laser beam 82 is directed to the workpiece 74 (FIG. 8) rather than a retroreflector 48, then the position of the returning laser beam 86 on the position detector 88 is not important. After passing through the first beam splitter 84, the outgoing laser beam 82 passes through a beam expander 90, which causes the diameter of the outgoing laser beam 82 to increase when the beam is traveling in the forward direction (out toward the retroreflector 48). The outgoing laser beam 82 then passes though a second beam splitter 92. Light from a projector 94 (similar to the projector 14 in the embodiments of FIGS. 1-5) sends a pattern of laser light 96 onto the second beam splitter 92. The reflected light 96 off of the second beam splitter 92 combines with the outgoing laser beam 82 from the distance meters 80, and the combined light 98 travels to either the retroreflector 48 or to the workpiece 74. In the case where the laser beam 98 is directed toward the workpiece 74, it may be possible to turn off the any visible light contained within the beam 82. This may allow the projected beam 98 to be more clearly seen.

Figure 10:
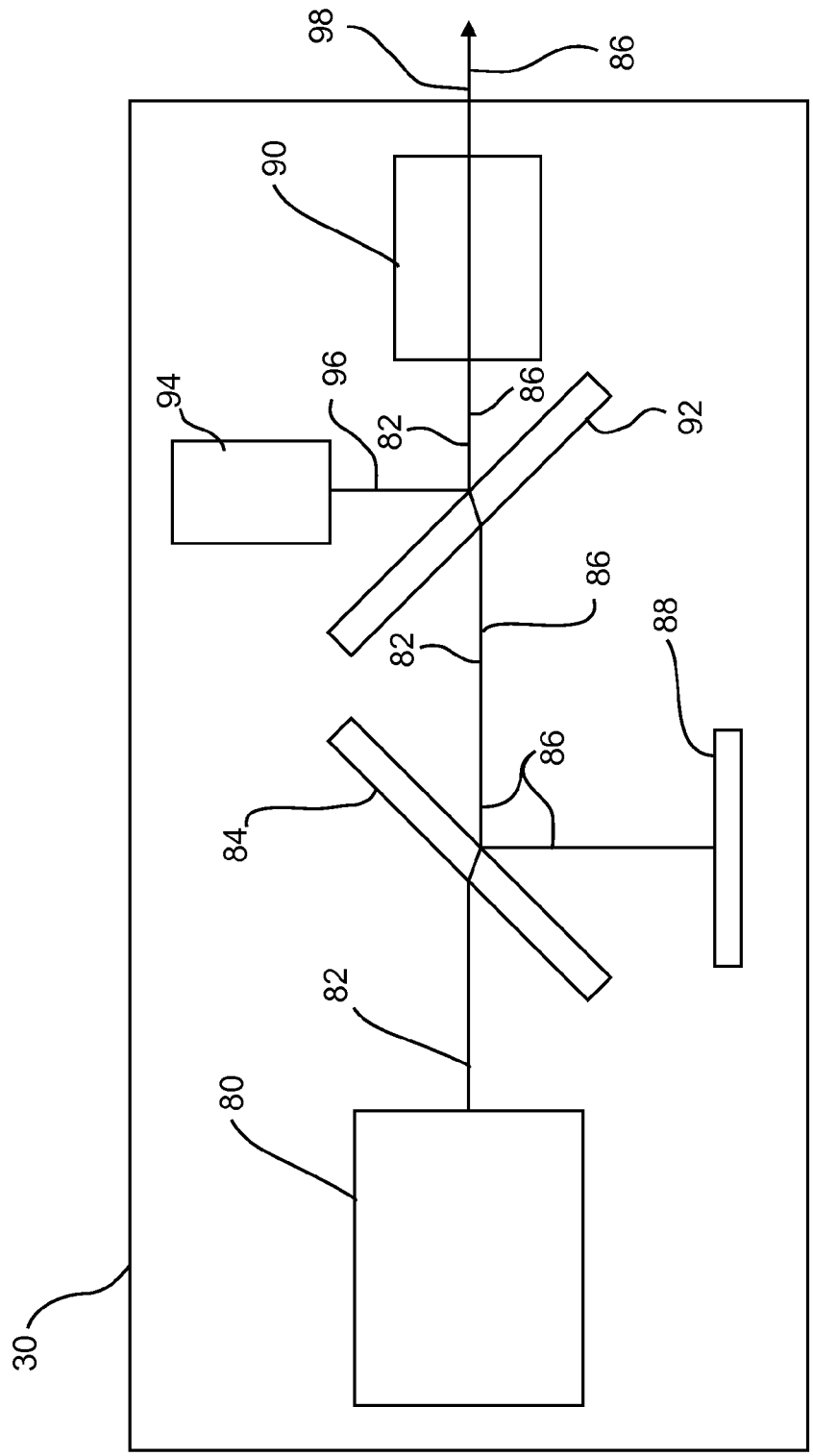
FIG. 10 is a block diagram of various components including a projector within a portion of the laser tracker of FIG. 6 according to other embodiments of the present invention.

Referring to FIG. 10, there illustrated is an embodiment of the various components of the laser tracker 30 similar to that of FIG. 9, except that the second beam splitter 92 and the projector 94 are both placed in front of the beam expander 90. The advantage of this approach is that the second beam splitter 92 can be made smaller than for the embodiment of FIG. 9. The disadvantage is that it may be more difficult to obtain proper alignment of the projector 94.

Figure 11:
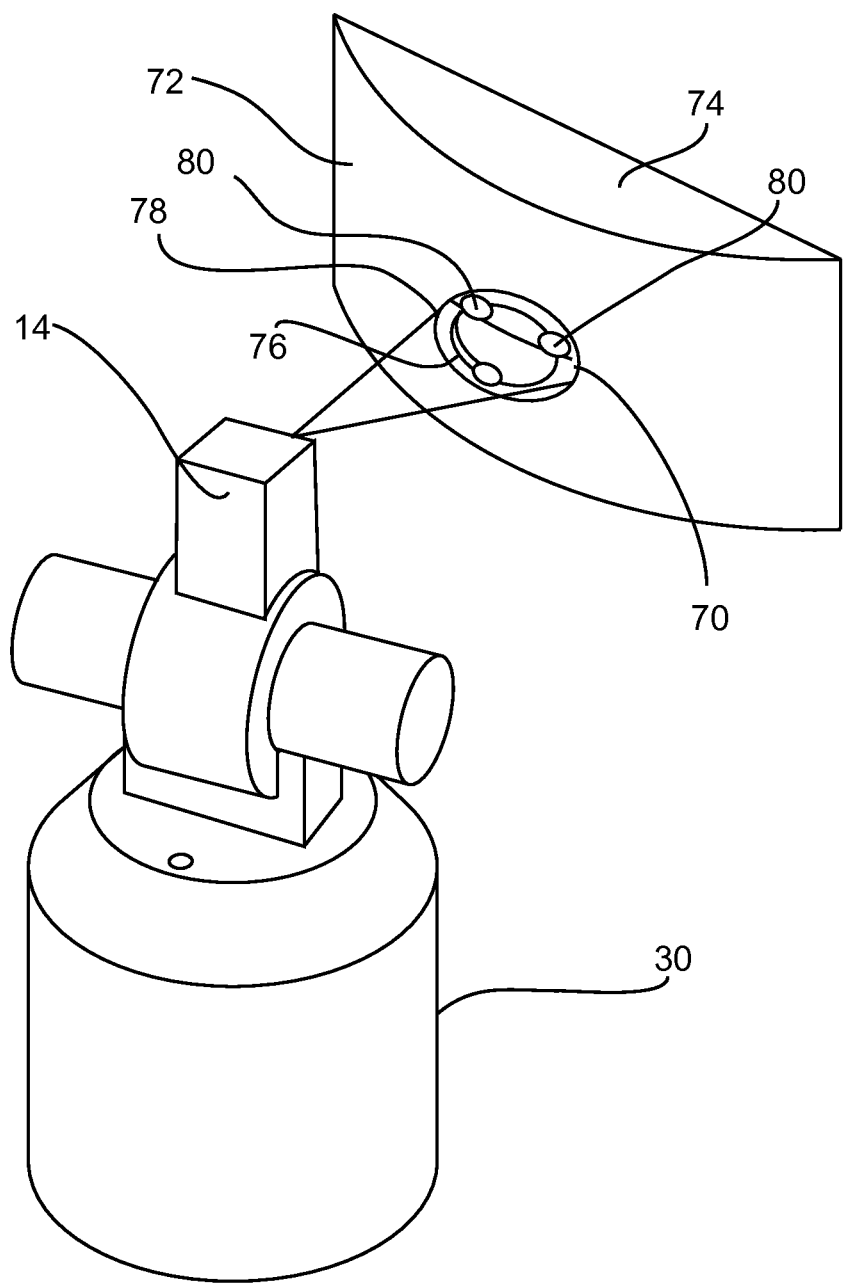
FIG. 11 is a perspective view of alternative embodiments of the laser tracker of FIG. 6 with an external projector projecting a pattern onto a surface of an object or workpiece.

In the embodiments illustrated in FIGS. 6-10 and described herein, the laser tracker 30 has the projector 94 integrated within the internal components of the laser tracker 30. However, in other embodiments, it is possible for the projector 94 to be mounted on or otherwise attached to the laser tracker 30. For example, FIG. 11 illustrates such an embodiment in which the laser tracker 30 has the projector 14 mounted on top of the tracker body. The projector 14 may be mounted rigidly to the tracker body or the projector 14 may be mounted using a gimbal mechanism 22 similar to that of the embodiment of the laser scanner 12 shown in FIG. 3.

In another embodiment, the projector is offset from the optical axis that carries the laser beams 82 and 86. By moving the projector from the optical axis, the optical system that carries the light beam 82 may be made more compact and the distance from the projector to the region outside the tracker made smaller, thereby enabling creation of two-dimensional patterns having larger divergence angles. In this embodiment, it is not necessary to provide an independent axis for zenith (horizontal axis) rotation.

In the various embodiments of the present invention described hereinabove with respect to the laser tracker 30 of FIGS. 6-11, the projector 94, in a similar manner to the projector 14 of the laser scanner embodiments of the present invention described hereinabove with respect to FIGS. 1-5, may project images, data or other information. Such projected information provides visualization to an operator of various types of information that is useful during a measurement session using the laser tracker 30, or the projected images or data can assist in visualization of data previously taken by the equipment 12. The projected visual information may, for example, be of a type such as to provide guidance to an operator, such as written instructions, highlighted points to be measured, indicated areas where data are to be taken, and real time feedback on the quality of the data. This visual information provided to the operator may, for example, be in the form of visual cues, text or some other visual form of information. The uses to which the projected images may be put are generally the same as for a laser scanner. Of particular importance for laser trackers are (1) projections in which marks indicate where material is to be removed from or added to a structure and (2) projections in which marks indicate where components are to be added to a structure.

While preferred embodiments have been shown and described, various modifications and substitutions may be made thereto without departing from the spirit and scope of the invention. Accordingly, it is to be understood that the present invention has been described by way of illustrations and not limitation.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A coordinate measuring device having a three-dimensional coordinate system, comprising:
    a light source configured to send a light beam to a first point;
    an optical detector configured to convert a portion of the light beam reflected back from the first point into a first electrical signal;
    a first processor configured to calculate a first distance from the coordinate measuring device to the first point, the calculation based at least in part on the first electrical signal and a speed of light in air;
    a projector integrated within a body of the coordinate measuring device or mounted to the body of the coordinate measuring device at a predetermined location, the projector being configured to project a two-dimensional pattern of visible light onto an object, the projected visible light being indicative of images, data, or information, the projector including an array of programmable pixels configured to produce the two-dimensional pattern in response to instructions received from a second processor;
    a beam steering mechanism configured to rotate the light beam and the two-dimensional pattern of light about a first axis by a first angle, the beam steering mechanism being further configured to rotate the light beam about a second axis by a second angle;
    a first angular transducer configured to measure the first angle; and
    a second angular transducer configured to measure the second angle.

2. The coordinate measuring device of claim 1, wherein the first point is on a target, a portion of the target being in contact with the object.

3. The coordinate measuring device of claim 2, wherein the target includes a retroreflector.

4. The coordinate measuring device of claim 1, wherein the first point is on the object.

5. The coordinate measuring device of claim 1, further comprising:
    a first optical system configured to project the light beam, the first optical system having a first optical axis; and
    a second optical system configured to project the two-dimensional pattern of light, the second optical system having a second optical axis.

6. The coordinate measuring device of claim 5, wherein the first optical axis and the second optical axis are distinct.

7. The coordinate measuring device of claim 5, wherein the first optical system and the second optical system share a common optical element.

8. The coordinate measuring device of claim 1, wherein the beam steering mechanism is configured to rotate at least one of the first angle and the second angle by 180 degrees or more.

9. The coordinate measuring device of claim 1, wherein the instructions from the second processor are based at least in part on the first distance.

10. The coordinate measuring device of claim 1, wherein the instructions from the second processor are based at least in part on an orientation of the object with respect to the coordinate measuring device.

11. The coordinate measuring device of claim 1, further comprising a beam splitter, wherein one of the light beam and the two-dimensional pattern of light is reflected off the beam splitter and the other of the light beam and the two-dimensional pattern of light is transmitted through the beam splitter.

12. The coordinate measuring device of claim 11, wherein the beam splitter is a dichroic beam splitter.

13. The coordinate measuring device of claim 1, wherein three-dimensional coordinates of the point are obtained, the three-dimensional coordinates based at least in part on the first distance, the first angle, and the second angle.

14. The coordinate measuring device of claim 1, wherein the second processor is further configured to project hidden features onto a surface of the object, the hidden features representing elements behind the surface of the object.

15. The coordinate measuring device of claim 1, wherein the second processor is further configured to project patterns to guide in machining of the object or attaching of a component to the object.

16. The coordinate measuring device of claim 1, wherein the projector is configured to project colored light.

17. The coordinate measuring device of claim 1, wherein the second processor is further configured to project a contour map, the contour map indicating regions of relative deviation from a model.

18. The coordinate measuring device of claim 1, wherein the coordinate measuring device is one of a laser tracker, a laser scanner, and a total station.

19. The coordinate measuring device of claim 1, wherein all pixels of the projector emit light synchronously.

20. The coordinate measuring device of claim 1, wherein the projector is one of a microelectromechanical system (MEMS), a liquid crystal display (LCD), and a liquid crystal on silicon (LCOS) device.

\* \* \* \* \*